(12) United States Patent
Chikuma

(10) Patent No.: US 7,946,678 B2
(45) Date of Patent: May 24, 2011

(54) PRINTING APPARATUS AND DATA PROCESSING METHOD

(75) Inventor: Toshiyuki Chikuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 12/212,142

(22) Filed: Sep. 17, 2008

(65) Prior Publication Data

US 2009/0073226 A1 Mar. 19, 2009

(30) Foreign Application Priority Data

Sep. 19, 2007 (JP) ................. 2007-242669

(51) Int. Cl.
*B41J 2/15* (2006.01)
*B41J 2/145* (2006.01)

(52) U.S. Cl. ................. 347/41; 347/16; 347/15

(58) Field of Classification Search ........... 347/9, 12, 347/14, 15, 16, 37, 40, 41–43, 54
See application file for complete search history.

(56) References Cited

U.S. PATENT DOCUMENTS

| 5,625,389 | A | 4/1997 | Eriksen et al. |
| 6,170,932 | B1 | 1/2001 | Kanaya et al. |
| 6,447,098 | B2 * | 9/2002 | Mitsuzawa ............ 347/40 |
| 6,612,685 | B1 * | 9/2003 | Marra et al. ........... 347/41 |

FOREIGN PATENT DOCUMENTS

| JP | 7-251513 A | 10/1995 |
| JP | 10-157137 A | 6/1998 |
| JP | 11-34397 A | 2/1999 |

* cited by examiner

*Primary Examiner* — Thinh H Nguyen
(74) *Attorney, Agent, or Firm* — Fitzpatrick, Cella, Harper & Scinto

(57) ABSTRACT

In the case where a multipass printing and an interlace printing are used together, the present invention enables outputting an image of good quality independently of the relation between the number of passes in the multipass printing and increase in the resolution in the sub-scanning direction through the interlace printing. Data processing is executed while pixels of inputted image data are made to correspond to two or more rasters in the sub-scanning direction, so that the dots are arranged in these rasters at a substantially equal rate, in the case where the number of print scannings to be executed multiple times is not an integral multiple of the number of rasters.

7 Claims, 30 Drawing Sheets

| NOZZLE COMPLEMENTARY WIDTH (×p) | FIRST PRINT SCANNING | SECOND PRINT SCANNING | THIRD PRINT SCANNING | FOURTH PRINT SCANNING | FIFTH PRINT SCANNING | SIXTH PRINT SCANNING | SEVENTH PRINT SCANNING |
|---|---|---|---|---|---|---|---|
| 4 | Mask 3A | | | | | | |
| 4 | Mask 3B | Mask 3C | | | | | |
| 4 | Mask 3C | Mask 3B | Mask 3A | | | | |
| 4 | | Mask 3A | Mask 3B | Mask 3C | | | |
| 4 | | | Mask 3C | Mask 3B | Mask 3A | | |
| 4 | | | | Mask 3A | Mask 3B | Mask 3C | |
| 4 | | | | | Mask 3C | Mask 3B | Mask 3A |
| 4 | | | | | | Mask 3A | Mask 3B |
| 4 | | | | | | | Mask 3C |

MASK 3A + MASK 3B + MASK 3C = 100%
MASK 3A : 25%, MASK 3B : 25%, MASK 3C : 50%

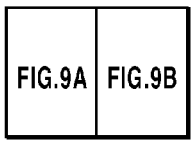
FIG. 9
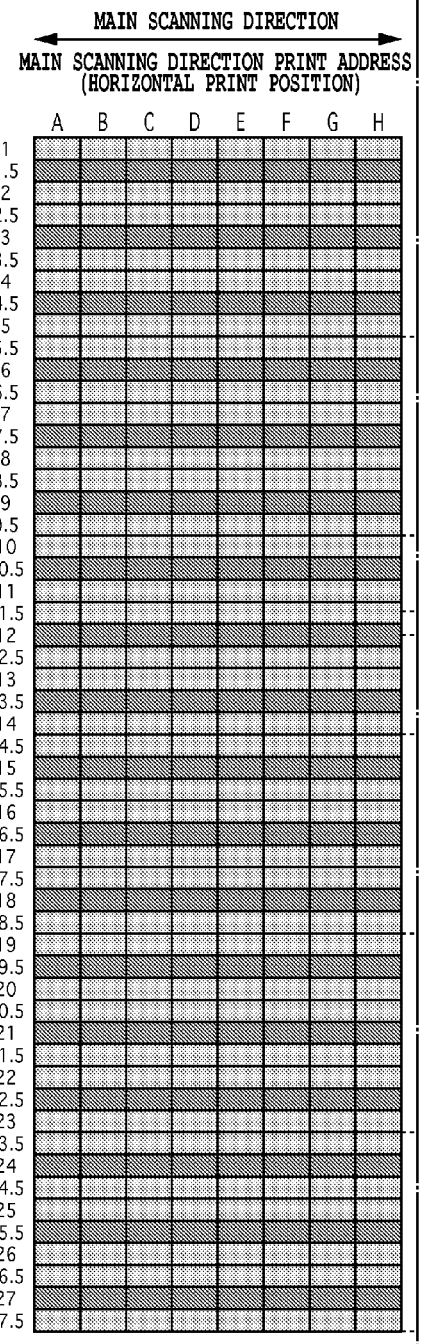
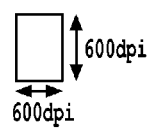
FIG. 9A

FIG.10

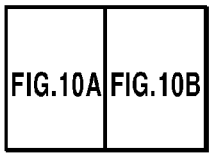

FIG.10A

| SUBSTANTIAL PRINT SCANNING | TOTAL PRINT ALLOWING RATE (PRINT ALLOWING RATE × NUMBER OF SCANNINGS) | MAIN SCANNING DIRECTION PRINT ADDRESS (HORIZONTAL PRINT POSITION) | | | | | | | | |
|---|---|---|---|---|---|---|---|---|---|---|
| | | | A | B | C | D | E | F | G | H |
| 1→(2)→(3)→(4)  (1)→2→(3)→4  (1)→(2)→3→(4) | 33%(33%×1)  33%(17%×2)  33%(33%×1) | 1  1.3  1.7 | | | | | | | | |
| 1→(2)→(3)→(4)  (1)→2→(3)→4  (1)→(2)→3→(4) | 33%(33%×1)  33%(17%×2)  33%(33%×1) | 2  2.3  2.7 | | | | | | | | |
| 1→(2)→(3)→(4)  (1)→2→(3)→4  (1)→(2)→3→(4) | 33%(33%×1)  33%(17%×2)  33%(33%×1) | 3  3.3  3.7 | | | | | | | | |
| (2)→(3)→(4)→5  2→(3)→4→(5)  (2)→3→(4)→(5) | 33%(33%×1)  33%(17%×2)  33%(33%×1) | 4  4.3  4.7 | | | | | | | | |
| (2)→(3)→(4)→5  2→(3)→4→(5)  (2)→3→(4)→(5) | 33%(33%×1)  33%(17%×2)  33%(33%×1) | 5  5.3  5.7 | | | | | | | | |
| (2)→(3)→(4)→5  2→(3)→4→(5)  (2)→3→(4)→(5) | 33%(33%×1)  33%(17%×2)  33%(33%×1) | 6  6.3  6.7 | | | | | | | | |
| (3)→(4)→5→(6)  (3)→4→(5)→6  3→(4)→(5)→(6) | 33%(33%×1)  33%(17%×2)  33%(33%×1) | 7  7.3  7.7 | | | | | | | | |
| (3)→(4)→5→(6)  (3)→4→(5)→6  3→(4)→(5)→(6) | 33%(33%×1)  33%(17%×2)  33%(33%×1) | 8  8.3  8.7 | | | | | | | | |
| (3)→(4)→5→(6)  (3)→4→(5)→6  3→(4)→(5)→(6) | 33%(33%×1)  33%(17%×2)  33%(33%×1) | 9  9.3  9.7 | | | | | | | | |
| (4)→5→(6)→(7)  4→(5)→6→(7)  (4)→(5)→6→7 | 33%(33%×1)  33%(17%×2)  33%(33%×1) | 10  10.3  10.7 | | | | | | | | |
| (4)→5→(6)→(7)  4→(5)→6→(7)  (4)→(5)→6→7 | 33%(33%×1)  33%(17%×2)  33%(33%×1) | 11  11.3  11.7 | | | | | | | | |
| (4)→5→(6)→(7)  4→(5)→6→(7)  (4)→(5)→6→7 | 33%(33%×1)  33%(17%×2)  33%(33%×1) | 12  12.3  12.7 | | | | | | | | |
| 5→(6)→(7)→(8)  (5)→6→(7)→8  (5)→(6)→7→(8) | 33%(33%×1)  33%(17%×2)  33%(33%×1) | 13  13.3  13.7 | | | | | | | | |
| 5→(6)→(7)→(8)  (5)→6→(7)→8  (5)→(6)→7→(8) | 33%(33%×1)  33%(17%×2)  33%(33%×1) | 14  14.3  14.7 | | | | | | | | |
| 5→(6)→(7)→(8)  (5)→6→(7)→8  (5)→(6)→7→(8) | 33%(33%×1)  33%(17%×2)  33%(33%×1) | 15  15.3  15.7 | | | | | | | | |
| (6)→(7)→(8)→9  6→(7)→8→(9)  (6)→7→(8)→(9) | 33%(33%×1)  33%(17%×2)  33%(33%×1) | 16  16.3  16.7 | | | | | | | | |
| (6)→(7)→(8)→9  6→(7)→8→(9)  (6)→7→(8)→(9) | 33%(33%×1)  33%(17%×2)  33%(33%×1) | 17  17.3  17.7 | | | | | | | | |
| (6)→(7)→(8)→9  6→(7)→8→(9)  (6)→7→(8)→(9) | 33%(33%×1)  33%(17%×2)  33%(33%×1) | 18  18.3  18.7 | | | | | | | | |

NOZZLE COMPLEMENTARY WIDTH (n):3

SUB-SCANNING DIRECTION PRINT ADDRESS (VERTICAL PRINT POSITION)

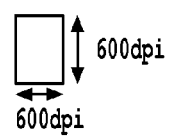

INPUTTED PRINT DATA PER PIXEL  600dpi × 600dpi

| NOZZLE COMPLEMENTARY WIDTH(×p) | FIRST PRINT SCANNING | SECOND PRINT SCANNING | THIRD PRINT SCANNING | FOURTH PRINT SCANNING | FIFTH PRINT SCANNING | SIXTH PRINT SCANNING | SEVENTH PRINT SCANNING |
|---|---|---|---|---|---|---|---|
| 3 | Mask 4A [r0] | | | | | | |
| 3 | Mask 4A [r1] | Mask 4B [r1] | | | | | |
| 3 | Mask 4A [r2] | Mask 4B [r2] | Mask 4C [r2] | | | | |
| 3 | Mask 4A [r3] | Mask 4B [r3] | Mask 4C [r3] | Mask 4D [r3] | | | |
| 3 | | Mask 4B [r4] | Mask 4C [r4] | Mask 4D [r4] | Mask 4A [r4] | | |
| 3 | | | Mask 4C [r5] | Mask 4D [r5] | Mask 4A [r5] | Mask 4B [r5] | |
| 3 | | | | Mask 4D [r6] | Mask 4A [r6] | Mask 4B [r6] | Mask 4C [r6] |
| 3 | | | | | Mask 4A [r7] | Mask 4B [r7] | Mask 4C [r7] |
| 3 | | | | | | Mask 4B [r8] | Mask 4C [r8] |
| 3 | | | | | | | Mask 4C [r9] |

MASK 4A + MASK 4B + MASK 4C + MASK 4D = 100%
MASK 4A : 33%, MASK 4B : 17%, MASK 4C : 33%, MASK 4D : 17%

[r*]: Offset

FIG.11

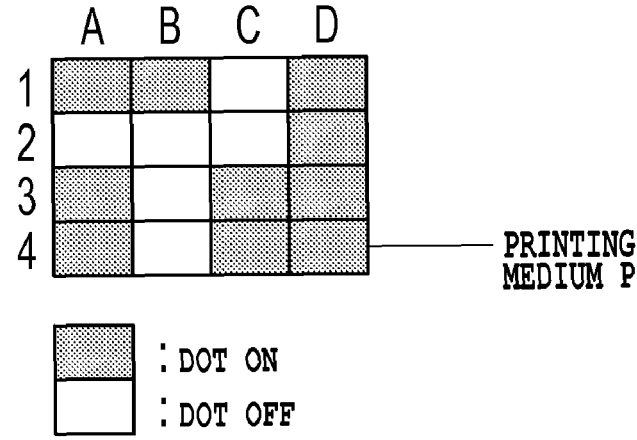
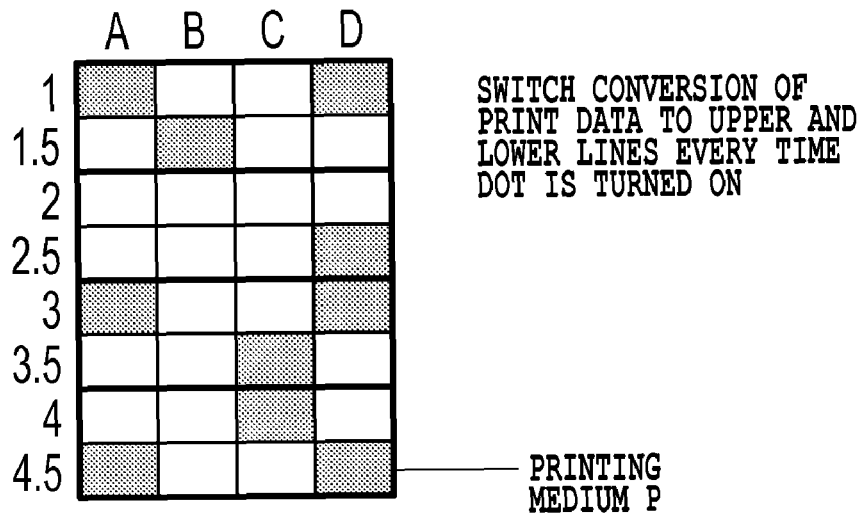
FIG.13B

FIG.14B

| NUMBER OF DOTS | AFTER DATA CONVERSION PROCESSING |
|---|---|
| 0 | 600dpi × 600dpi |
| 1 | *<br>*.5 |
| 2 | ※CONVERSION FOR EACH DATA<br>*<br>*.5 |

FIG.15

PRINTING APPARATUS AND DATA PROCESSING METHOD

BACKGROUND OF THE INVENTION

1. Field of the Invention

The present invention relates to a printing apparatus and a data processing method.

2. Description of the Related Art

As a printing apparatus, there is an inkjet printing apparatus which performs printing by ejecting inks from an inkjet printing head on a printing medium so as to form dots. The inkjet printing apparatus has various advantages such as easiness to achieve higher-precision printing, excellence in speed and quietness, and low cost.

Some of such inkjet printing apparatuses are configured to form an image on a printing medium by using a printing head in which nozzles as printing elements for ejecting inks are arranged in a predetermined direction at a predetermined pitch, while alternately repeating a printing movement and a conveying operation. In the printing movement, printing is performed while moving the printing head in a first direction which is different from the predetermined direction. In the conveying operation, the printing medium is conveyed in a second direction intersecting the first direction. Hereinafter, for convenience, movement of a printing head is referred to as the main scanning or the print scanning, and the moving direction thereof (first direction) is referred to as the main scanning direction. On the other hand, conveyance of a printing medium is referred to as the sub-scanning, and the conveying direction thereof (second direction) is referred to as the sub-scanning direction. In such an inkjet printing apparatus, a printing method called "multipass" is applied in many cases when high quality printing is performed.

FIG. 17 is an explanatory view of the multipass printing method. In the multipass printing method, multiple times of main scanning of the printing head are performed for a unit region on the printing medium, thereby performing printing based on the printed data during the multiple times of the main scanning. In the multipass printing, a printing operation is commonly named from the number of times of the main scanning (number of passes) for the unit region. As shown in FIG. 17, a printing in which the main scanning is performed three times for the unit region (in this example, a single print region) is referred to as the 3-pass printing. Note that, the definition of the "unit region" is not limited to this. For example, a region corresponding to "a" times of a width of a nozzle pitch (where "a" is a natural number) may be defined as the "unit region".

Note that, FIG. 17 shows that the positions of the printing head are shifted by a predetermined amount for each main scanning (from the first print scanning to the fourth print scanning), while the printing medium is fixed. However, these are illustrated for the purpose of convenience. Actually, the position of the printing head is fixed in the sub-scanning direction, and the printing medium is conveyed, between two continuous main scannings, toward the top of the drawing by a predetermined amount which is less than the array width of the nozzles. Hereinafter, unless otherwise specified, explanation will be also given for other drawings in accordance with the similar rule.

Performing such a multipass printing suppresses an adverse effect to an image, and thus the image quality can be improved. This is because factors for deterioration of image can be reduced. Such factors include density unevenness caused by variation in the ink ejecting amount and the ink ejecting direction for each nozzle, and a stripe caused by insufficient conveyance accuracy of the printing medium between the main scannings (a white stripe if the conveying amount is excessively large, and a black stripe if it is excessively small).

The multipass printing method has such good characteristics, but is not effective enough to cope with displacement of ink landing positions in some cases. This will be hereinafter described.

For example, assume that the arranging pitch of the nozzles is $\frac{1}{600}$ inch, i.e., approximately 42 μm (25.4 mm/600 dots), that is, the nozzle arranging resolution is 600 dpi (dots per inch). Here, consider two cases where the diameter of the ink dot having landed on the printing medium is approximately 32 μm and 42 μm.

Moreover, suppose that the conveying amount of the printing medium between the two main scannings is set to an integral multiple of the arranging pitch (42 μm) of the nozzles. Then, if the ink dot diameter is 42 μm, printing can be performed without any gap by aligning the ink dots in the sub-scanning direction. However, if the ink dot diameter is 32 μm, gaps exist between the ink dots aligned in the sub-scanning direction. In the former case, even if a slight conveying variation occurs in conveying the printing medium between the main scannings, the large ink dot diameters prevents change in the area factor from largely affecting a printed image. However, in the latter case, the printed image is sensitively affected by the change in the area factor.

FIG. 18 is an explanatory view of such a problem which occurs in the multipass printing. In the multipass printing, the sub-scanning (printing medium conveying) amount is usually set to an integral multiple of the nozzle pitch of the printing head. For this reason, downsizing of the ink dots results in gaps between the ink dots in the sub-scanning direction (that is, a region where printing cannot be performed, in this case, 10 μm). As apparent from FIG. 18, the nozzles for ejecting inks cannot be positioned so as to perform printing on these gaps even though the number of passes is increased. Therefore, when an error in the sub-scanning amount occurs, the printed image is sensitively affected by the change in the area factor. On the other hand, in the main scanning direction, the dots can be arranged without gaps by properly setting a timing of ink ejection during the print scanning.

For such problems, it is effective to use together a printing method called an interlace (Japanese Patent Laid-Open No. 10-157137(1998)) which is conventionally known as a high-resolution printing method.

FIG. 19 is an explanatory view of the inputted image data which is generated corresponding to the nozzle pitch (nozzle array resolution). The resolutions are 600 dpi for the main scanning direction and the sub-scanning direction, respectively. Printing of the image data with use of both the multipass printing and the interlace printing is as follows:

In the multipass printing, the printing medium is conveyed by the amounts equivalent to the width of the nozzle pitch (p)×n (where n is an integer equal to or greater than 0), and printing is performed while performing inter-pass complement with the width (hereinafter, also described as the "nozzle complementary width"). Use of the interlace printing together with the multipass printing means setting a conveying amount which is increased or decreased by the amount equivalent to 1/m (where m is an integer equal to or greater than 2) of the nozzle pitch from p×n, that is, a conveying amount which is a non-integral multiple of the nozzle pitch. In other words, the printing medium is conveyed relative to the printing head in the sub-scanning direction with use of the conveying amount of the nozzle pitch×(n+1/m) or the conveying amount of the nozzle pitch×(n−1/m) as appropriately, whereby printing is performed by increasing the printing resolution on the printing medium in the sub-scanning direction.

FIGS. 20A and 20B are explanatory views showing the case where the multipass printing is applied to the inputted image data shown in FIG. 19 and the case where the interlace printing is further applied to the data, respectively. Herein, for simplifying the explanation, a printing head on which 12 nozzles (seg 0 to seg 11) are arranged at a density of 600 dpi, and the 4-pass printing is performed for a unit region. Note that, the "unit region" refers to a region in which the inputted image data for 1 raster is printed. Particularly, in FIGS. 19, 20A, and 20B, the region formed by the width of the nozzle pitch (in the sub-scanning direction)×the printing width (in the main scanning direction) is defined as the "unit region".

In the case where an image is formed by the 4-pass printing shown in FIG. 20A, the nozzle complementary width is the nozzle pitch p×3(=n=12/4). In the multipass printing, the printing medium is conveyed by the amount equivalent to the width thereof after each main scanning. Meanwhile, in the case of FIG. 20B, the printing medium is conveyed by the amounts equivalent to p×3, p×3.5, p×3, and p×2.5 repeatedly, while the number of divisions of the nozzle pitch width is 2 (=m). Herein, "m" can be rephrased to the "number of divisions in the vertical direction (sub-scanning direction) of 1 pixel of the inputted image data".

Assume that addresses on the printing medium P are assigned with "A" to "H" in the horizontal position (main scanning direction position) and "1" to "12" in the vertical position (sub-scanning direction position). FIG. 19 is a schematic view of the inputted image data. The inputted image data of FIG. 19 is assigned to 1 pixel. Unlike FIG. 20B, no particular change for performing the interlace printing is made. In other words, the data a assigned to the pixel address A1 of the inputted image data should be printed to a printing pixel address A1 or A1.5 at a certain possibility in FIG. 20B.

In FIG. 20A, as a result of the sub-scanning (printing medium conveyance), the nozzles are set only at positions (hereinafter also referred to as raster) corresponding to integer pixel addresses (1, 2, 3, . . . ) in the vertical direction (sub-scanning direction). On the other hand, in FIG. 20B, the printing medium is conveyed by an amount equivalent to a number including a fraction on the decimal level (1/m). Accordingly, the nozzles can also be set at the positions with a fractional number (1/m) (that is, in the 1.5th raster, 2.5th raster, . . . ) in the vertical direction (sub-scanning direction). For example, in FIG. 20A, the nozzles seg 0, seg 3, seg 6 and seg 9 are set in the 1st raster of the vertical direction position to perform printing, and the nozzles seg 1, seg 4, seg 7 and seg 10 are set in the 2nd raster of the vertical direction position to perform printing. In this case, printing cannot be performed at the 1.5th raster position which is intermediate in the vertical direction. On the other hand, in FIG. 20B, printing at the 1.5th raster of the vertical direction can be performed.

As described above, in the case of FIG. 20B in which the interlace printing is used together with the multipass printing, the printing dots are arranged also at the sub-scanning direction positions, where printing cannot be performed in the case of FIG. 20A so as to increase the resolution, whereby robustness against displacement in the sub-scanning direction can be improved. Other various improvements have been proposed for the interlace (Japanese Patent Laid-Open No. 7-251513(1995), and Japanese Patent Laid-Open No. 11-034397(1999)).

However, the present inventors have found that a problem may occur depending on the relation between the number of passes of the multipass printing and increase in the resolution (the number of divisions m) in the sub-scanning direction through the interlace printing in the case where the interlace printing is used together with the multipass printing.

In FIG. 20B, printing is performed with use of the number m of divisions (=2) together with the 4-pass printing. Therefore, printing can be performed at the divided upper and lower rasters (that is, the positions with the integer addresses (1, 2, 3, . . . ) and the intermediate positions (1.5, 2.5, 3.5, . . . ) in the vertical direction) with 50% possibilities.

On the other hand, assume a case where the same input data is printed in the 3-pass printing, while setting the number m of divisions (=2), using the printing head with the same structure. In this case, the printing medium is conveyed by the amounts equivalent to p×3.5 and p×4.5, repeatedly. Then, as shown in FIG. 21, it is not possible to perform printing at the positions with the integer addresses and at the intermediate positions thereof at the equal possibility of 50%. Actually, the possibilities for both positions are respectively 33% and 66%. In addition, the appearance pattern of 33% and 66% is inverted at certain intervals.

FIG. 21 shows, substantial print scanning, total print allowing rates, and print images on the printing medium P in addition to the contents described in FIG. 20. Herein, the substantial print scanning represents that each raster existing in the vertical direction position is substantially printed by what number of the print scanning. For example, printing is performed on the first raster print position, by the first print scanning and the third print scanning. Since printing on the first raster cannot be performed by the second print scanning because the nozzle is at positions displaced by the amount equivalent to 0.5 pitch, the second print scanning is represented in parenthesis. As a result, the substantial print scanning is expressed as 1->(2)->3. On the other hand, on the 1.5th raster print position, contrary to the 1st raster, printing cannot be performed in the first and third print scanning since the nozzle is at the positions displaced by the amount equivalent to 0.5 pitch, and printing can be performed only in the second scanning. Therefore, the substantial print scanning is expressed as (1)->2->(3).

In the print scanning, in fact, printing is performed by applying a mask which specifies the print allowing rate for determining the arrangement of the print allowing pixels that are in complementary relation to the inputted image data. In the 3-pass printing, a mask is applied which enables printing one inputted image data at a possibility of 1/3 (=33%) in each scanning (hereinafter, the possibility that printing can be performed in each scanning is also referred to as the "print allowing rate".). In this case, the total print allowing rate is calculated as the product of the print allowing rate and the number of substantial print scannings out of the total number of implemented print scannings (specifically, the number of print scannings except the print scannings in parenthesis). The number of substantial print scannings is 2 at the print position 1 since printing can be performed in the first and third print scannings, and it is 1 at the print position 1.5 since printing can be performed only in the second scanning. In other words, in the illustrated example, the total print allowing rates are 33% and 66% depending on their vertical print positions, and the total print allowing rates at the 1st and 1.5th raster print positions are 66% and 33%, respectively. Then, at the printing positions away from the 1st and 1.5th raster print positions by the amount equivalent to 1 nozzle complementary width (p×4), the pattern of the total print allowing rates 66% and 33% is inverted. Specifically, at the 5th and 5.5th raster print positions, the total print allowing rates are 33% and 66%, respectively. To facilitate understanding, in FIG. 21, the regions of the printing medium P with the total print allowing rate 66% are indicated in dark gray, and the regions with the total print allowing rate 33% are indicated in light gray. In this way, the total print allowing rates for the rasters are not the same, and the appearance pattern thereof is inverted at certain intervals.

The 3-pass printing is not the only printing in which the total print allowing rates are different depending on the vertical direction print position (raster). For example, also in the case where the 5-pass printing is performed, as shown in FIG. 22, it is understood that a print allowing rates are different depending on the rasters. In FIG. 22, a printing head in which 15 nozzles (seg 0 to seg 14) are arranged at a density of 600 dpi. In addition, the 5-pass printing is performed while setting the nozzle complementary width to the nozzle pitch P×3 (=n=15/5), and the number of divisions of the nozzle pitch to 2 (=m). In this case, the printing medium is conveyed by the amounts equivalent to p×3.5 and p×2.5, repeatedly. Then, as apparent from the drawing, portions where printing is completed by three times of print scanning and portions where printing is completed by two times of print scanning are generated. As a result of this, the regions with the total print allowing rate 60% and the regions with 40% are mixed.

As described above, in the case where the inputted image data is divided into the image data corresponding to m (where m is an integer equal to or greater than 2) rasters that continue in the sub-scanning direction to perform printing in the interlace method, the number of the passes to be printed N (where N is an integer equal to or greater than 3) must be 'a' times of the number of divisions m (where a is a natural number). Otherwise, the following problems would be caused. In other words, as shown in FIGS. 21 and 22, print allowing rates are different among the print positions in the sub-scanning direction, and printing is performed while the print positions with different print allowing rates are mixed irregularly. These in turn cause stripe or unevenness on the image.

SUMMARY OF THE INVENTION

The present invention has been made in consideration of the above-described problems. An object of the present invention is to form an image of good quality independently of the relation between the number of passes of the multipass printing and increase in the resolution in the sub-scanning direction through an interlace printing, in the case where the interlace printing is used together with the multipass printing.

In a first aspect of the present invention, there is provided a printing apparatus for performing printing with use of a printing head in which printing elements are arranged in a predetermined direction to form dots on a printing medium, the printing apparatus comprising:

a print controller that completes a printing for a unit region on the printing medium by causing a printing movement for printing by moving the printing head relative to the printing medium in a first direction different from the predetermined direction and a conveying operation for conveying the printing medium in a second direction intersecting the first direction by an amount smaller than a width at which the printing elements are arranged, the printing for the unit region being executed by N (N is an integer equal to or greater than 3 or more) times of the printing movement; and a divider that divides inputted image data to be printed on the unit region into image data corresponding to m rasters that continue in the second direction (where m is an integer equal to or greater than 2), wherein when N is not an integral multiple of m, the divider divides the inputted image data so that the dots are formed for the m rasters at a substantially equal rate.

In a first aspect of the present invention, there is provided a data processing method of processing data used for completing a printing for a unit region on a printing medium, the printing being executed by causing a printing movement for printing by moving a printing head in which printing elements are arranged in a predetermined direction to form dots on the printing medium relative to the printing medium in a first direction different from the predetermined direction and a conveying operation for conveying the printing medium in a second direction intersecting the first direction by an amount smaller than a width at which the printing elements are arranged, and by causing N (N is an integer equal to or greater than 3 or more) times of the printing movement to the unit region, the data processing method comprising the steps of:

inputting image data to be printed on the unit region; and dividing the inputted image data into image data corresponding to m rasters that continue in the second direction (where m is an integer equal to or greater than 2), wherein in the step of dividing inputted image data, the inputted image data is divided so that the dots are formed in the m the rasters at a substantially equal rate when N is not an integral multiple of m.

According to the present invention, when printing is performed for a unit region by scanning of the printing head N times in accordance with the interlace method, the inputted image data to be printed in the unit region is divided into the image data corresponding to m pieces of rasters continuing in the sub-scanning direction. At this time, the inputted image data is divided so that the dots are arranged in the m rasters at a substantially equal rate, if N (where N is an integer equal to or greater than 3) is not an integral multiple of m (where m is an integer equal to or greater than 2). As a result of this, it is possible to reduce deterioration of image caused by different print allowing rates depending on the print positions in the sub-scanning direction and printing being performed with the print positions with different print allowing rates being mixed irregularly.

Further features of the present invention will become apparent from the following description of exemplary embodiments (with reference to the attached drawings).

BRIEF DESCRIPTION OF THE DRAWING

FIGS. 5A and 5B are explanatory views showing two examples of mask application in Embodiment 1;

FIGS. 7A and 7B are explanatory views for explaining another example of the printing operation in the case where Embodiment 1 is applied;

FIG. 8A and 8B are explanatory views for explaining a still another example of the printing operation in the case where Embodiment 1 is applied;

FIG. 9 is a diagram showing the relationship of FIGS. 9A and 9B;

FIG. 9A is an explanatory view for explaining a problem which Embodiment 2 of the present invention addresses;

FIG. 10 is a diagram showing the relationship of FIGS. 10A and 10B;

FIG. 10A is an explanatory view for explaining an example of the printing operation in the case where Embodiment 2 is applied;

FIG. 11 is an explanatory view of mask application in Embodiment 2;

FIGS. 13A and 13B are explanatory views for explaining a series of processing executed to the inputted image data in Embodiment 3;

FIG. 14A and 14B are explanatory views for explaining an example of the printing operation in the case where Embodiment 3 is applied;

FIG. 15 is an explanatory view for explaining a print data conversion method according to a modification of Embodiment 3;

DESCRIPTION OF THE EMBODIMENTS

Hereinafter, the present invention will be explained in detail with reference to the drawings.

In the explanation to be described below, first, the mechanical structure and the structure of the control system of the inkjet printing apparatus that can be commonly applied to all embodiments will be described. Subsequently, the individual embodiments will be described in detail.

<The Mechanical Structure of the Inkjet Printing Apparatus>

Figure 1:
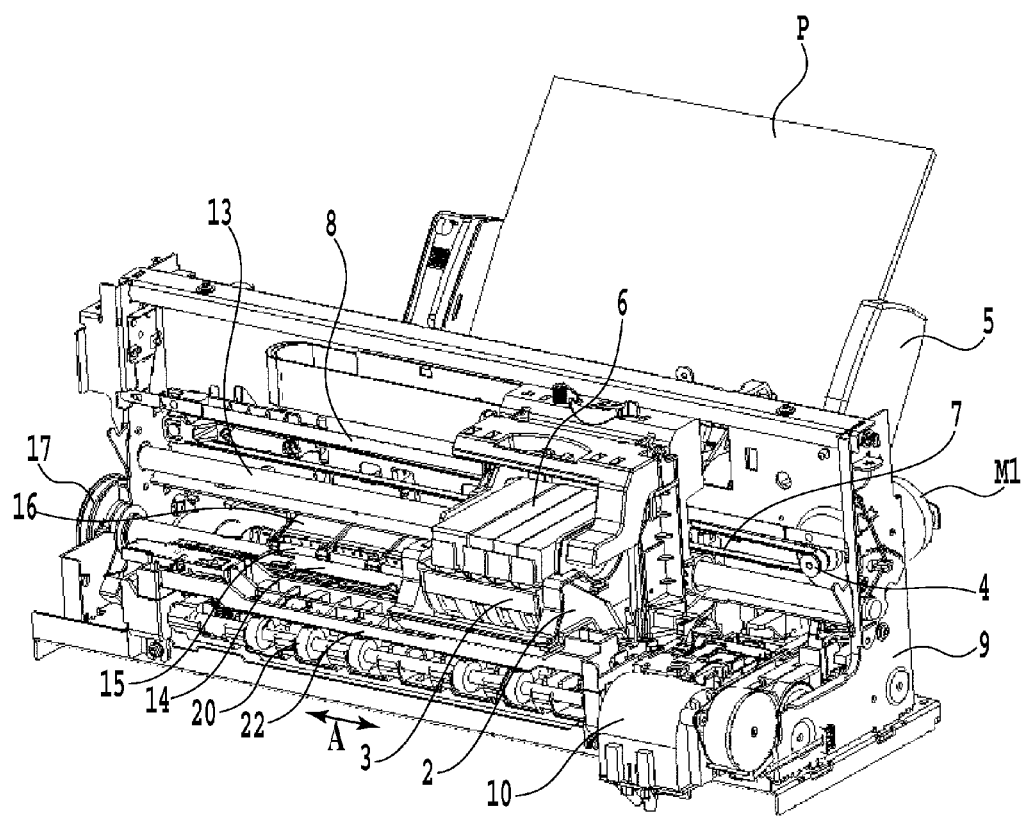
FIG. 1 is an exterior perspective view showing an outline of a structure of an inkjet printing apparatus to which the present invention can be applied.

FIG. 1 is an exterior perspective view showing an outline of the structure of an inkjet printing apparatus 1 to which the present invention can be applied.

In the printing apparatus shown in FIG. 1, a printing head 3 which ejects ink in accordance with the inkjet method for printing is mounted on a carriage 2. In the printing apparatus, a driving force generated by a carriage motor M1 is transmitted to the carriage 2 via a transmission mechanism 4, thereby to cause the carriage 2 to reciprocate in the arrow A directions (main scanning directions), during which the printing apparatus provides a print signal to the printing head 3 thereby to enable the printing head 3 to eject ink. Meanwhile, a printing medium P, for example, paper or the like, is fed from a paper feeding mechanism 5, and is conveyed to a position where printing is performed (hereinafter referred to as the "print position"). At the print positions, the printing medium P receives the ink ejected from the printing head 3.

The carriage 2 is not only equipped with the printing head 3, but also is mounted with an ink cartridge 6 containing the ink to be supplied to the printing head 3. The ink cartridge 6 is attachable to and detachable from the carriage 2.

The printing apparatus shown in FIG. 1 is capable of color printing. Accordingly, the carriage 2 is equipped with four ink cartridges which respectively contain inks of magenta (M), cyan (C), yellow (Y) and black (K) and corresponding printing heads.

The carriage 2 and the printing head 3 can secure and maintain required electric connection through proper contact of predetermined joint surfaces of the both. The printing head 3 performs printing by selectively ejecting ink from a plurality of ejection openings by applying energy generated in response to the print signal. Particularly, the printing head 3 of the present embodiment employs the method of ejecting ink with use of thermal energy, which includes electrothermal transducer element for converting electric energy to thermal energy. When the thermal energy is applied to ink, film boiling of the ink occurs, resulting in growth and subsequent shrinkage of a bubble. This causes a pressure change, through which the printing head 3 ejects the ink from the ejection openings. The electrothermal transducer element is provided, for example, corresponding to each of the ejection openings. By applying a pulse voltage to each of the electrothermal transducer elements in accordance with the print signal, the printing head 3 ejects the ink from the corresponding ejection opening.

As shown in FIG. 1, the carriage 2 is coupled to a part of a drive belt 7 of the transmission mechanism 4 which transmits the driving force of the carriage motor M1, and is guided and supported slidably along a guide shaft 13 in the arrow A direction. Therefore, the carriage 2 is caused to reciprocate along the guide shaft 13 by forward rotation and reverse rotation of the carriage motor M1. In addition, a scale 8 for indicating an absolute position of the carriage 2 is provided along the moving direction (arrow A direction) of the carriage 2. In the present embodiment, as the scale 8, a transparent PET film on which black bars are printed at required pitches is used. One end of the scale 8 is fixed to a chassis 9, and the other end is supported by the leaf spring (not shown).

Meanwhile, the printing apparatus is provided with a platen (not shown) in a region opposite to an ejection face on which ejection openings (not shown) of the printing head 3 are formed. In addition, during the process in which the carriage 2 equipped with the printing head 3 is caused to reciprocate by the driving force of the carriage motor M1, the printing apparatus provides a print signal to the printing head 3 so as to eject the ink, thereby to perform printing across the entire width of the printing medium P conveyed onto the platen.

Further, in FIG. 1, a numeral 14 denotes a conveying roller which is driven by a conveying motor M2 in order to convey the printing medium P. In addition, a numeral 15 denotes a pinch roller urged by a spring, not shown, in the direction in which it abuts with the conveying roller 14, a numeral 16 denotes a pinch roller holder supporting the pinch roller 15 rotatably, and a numeral 17 denotes a conveying roller gear fixed to one end of the conveying roller 14. Through transmission of the driving force of the conveying motor M2 via a transmission mechanism including the conveying roller gear 17 and an intermediate gear (not shown), the conveying roller 14 is rotatably driven, and the printing medium P is nipped and conveyed by the conveying roller 14 and the pinch roller 16. The conveying direction of the printing medium is a direction intersecting the main scanning direction which is the moving direction of the printing head.

Further, a numeral 20 denotes a discharge roller for discharging the printing medium P on which an image is formed by the printing head 3 to outside of the printing apparatus. The discharge roller is driven through transmission of rotation of the conveying motor M2. Note that, a spur roller (not shown) urged by a spring not shown is pressed against the discharge roller 20 from the printed surface of the printing medium P. A numeral 22 denotes a spur holder for rotatably supporting the spur roller.

Further, in the printing apparatus, as shown in FIG. 1, a recovery apparatus 10 is disposed at a predetermined position (for example, a position corresponding to a home position) located outside of a range of reciprocal motion for the printing operation of the carriage 2 equipped with the printing head 3 (outside the print region). The recovery apparatus 10 is used for recovery from an ejection failure of the printing head 3, or for maintaining a good ejection state of the printing head 3.

<The Structure of the Control System of the Inkjet Printing Apparatus (FIG. 2)>

Figure 2:
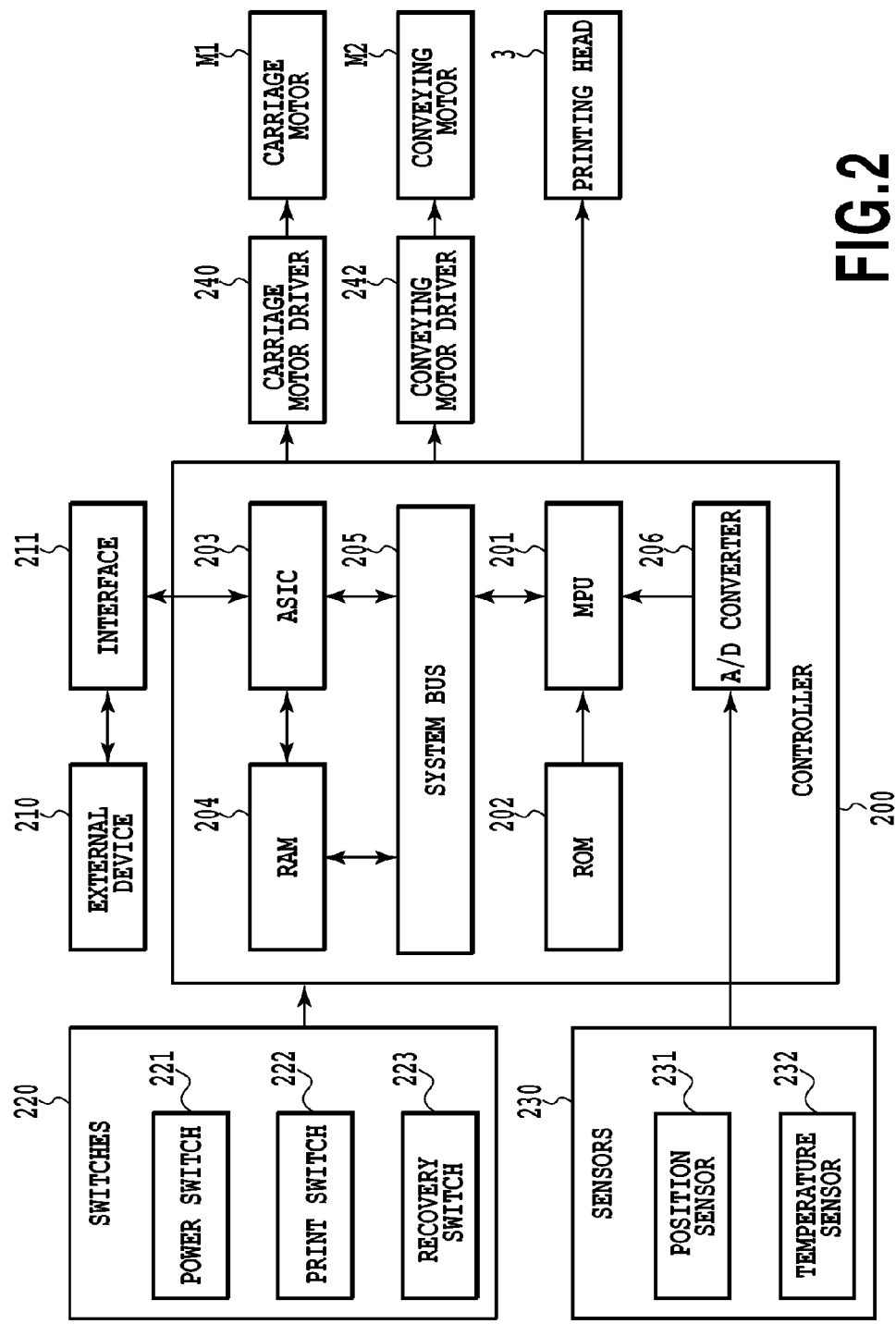
FIG. 2 is a block diagram showing a configuration example of a control system of the printing apparatus shown in FIG. 1.

FIG. 2 is a block diagram showing a configuration example of the control system of the printing apparatus shown in FIG. 1.

As shown in FIG. 2, a controller 200 serving as the main controller of the printing apparatus includes an MPU 201, an ROM 202, an application specific integrated circuit (ASIC) 203 and an RAM 204. Herein, the ROM 202 stores programs corresponding to a control procedure which will be described later, a required table and other fixed data. The ASIC 203 generates control signals for control of the carriage motor M1, the conveying motor M2, and the printing head 3. The RAM 204 includes an arranging region of the image data, a work region for executing the program, and the like. In addition, the controller 200 is provided with a system bus 205 for connecting the MPU 201, the ASIC 203 and the RAM 204 with each other and sending and receiving data. Further, the controller 200 is provided with an A/D converter 206 which receives an analog signal from sensors which will be hereinafter described to perform A/D conversion and supplies a digital signal to the MPU 201.

In addition, in FIG. 2, a numeral 210 denotes an external device such as a computer, a reader for reading an image or a digital camera, which supply the image data to the printing apparatus. The external device 210 and the printing apparatus send and receive print data, a command, a status signal or the like via an interface (I/F) 211.

A numeral 220 denotes switches for receiving a command input by the operator. Specifically, the switches include a power switch 221, a print switch 222 for instructing start of printing, a recovery switch 223 for instructing activation of processing (recovery processing) for maintaining the ink ejection performance of the printing head 3 in a favorable state, and the like. A numeral 230 denotes sensors for detecting the state of the apparatus including a position sensor 231 such as a photo coupler for detecting the home position, a temperature sensor 232 provided at an appropriate location of the printing apparatus for detecting an environmental temperature, and the like.

Further, a numeral 240 denotes a carriage motor driver which drives the carriage motor M1 for causing the carriage 2 to perform reciprocating scanning in the arrow A direction, and a numeral 242 denotes a conveying motor driver which drives the conveying motor M2 for conveying the printing medium P.

In the above-described configuration, the main body of the printing apparatus analyses the command of the print data transferred via the interface 211, and develops the image data to be used for printing in the RAM 202. During the print scanning by the printing head 3, the ASIC 203 transfers the drive data of the electrothermal transducer element (ejection heater), which serves as the printing element, to the printing head, while accessing directly to the storage region of the RAM 202.

Embodiment 1

Figure 3:
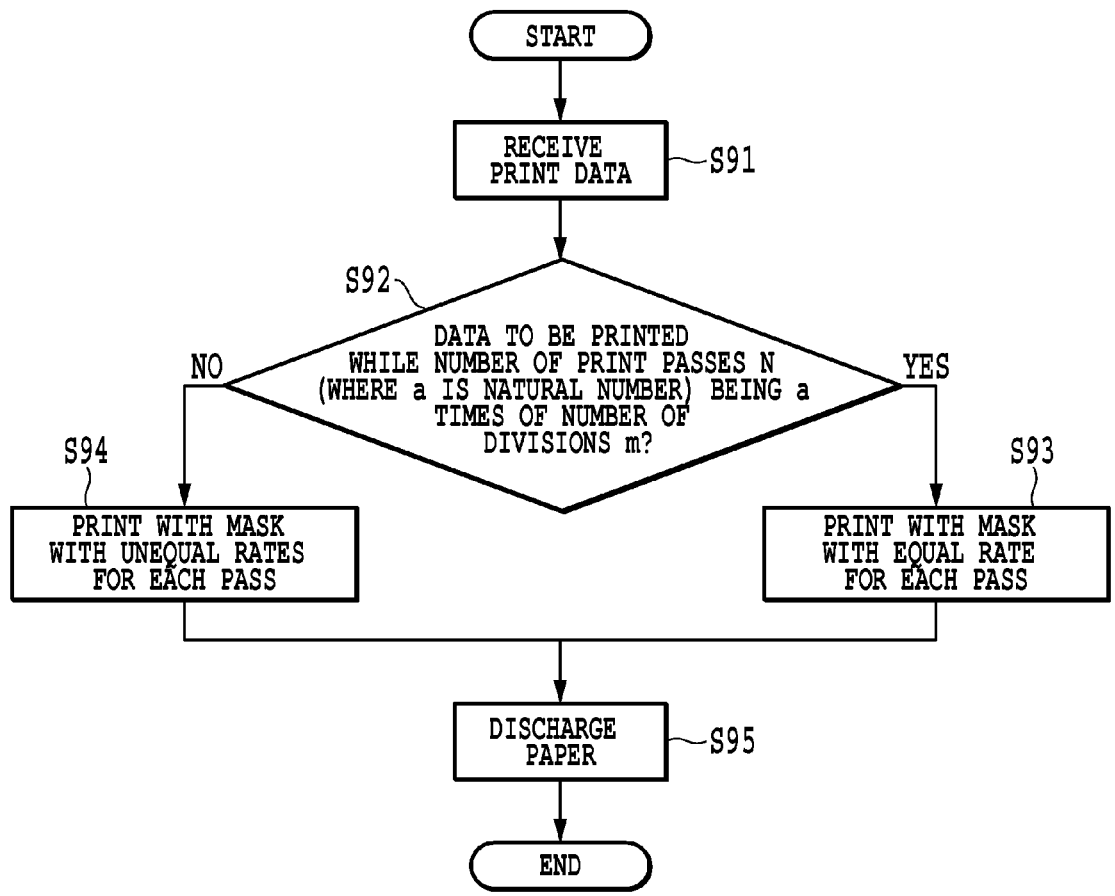
FIG. 3 is a flowchart showing an example of a processing procedure executed in Embodiment 1 of the present invention.

FIG. 3 is a flowchart showing an example of a processing procedure executed in Embodiment 1 of the present invention.

First, in Step S91, information containing the print data (inputted image data) is received from the external device 210. Next, the processing advances to Step S92, where it is determined whether or not the relation expressed as the following equation is satisfied:

the number of print passes $N$=the number of divisions $m \times a$ (where $a$ is a natural number).

Herein, for example, the information specified by a printer driver of the external device 210 and received by the printing apparatus may include information related to printing qualities such as high-quality printing, normal-quality printing and high-speed printing, and information of a type of the printing medium subject to the printing. Accordingly, the printing apparatus can determine the number of passes N for the unit region, the number of divisions in the sub-scanning direction m of the inputted image data to be printed in the unit region, and the mask to be applied, in accordance with such information. Note that the "unit region" herein can be defined as the region equivalent to 1 raster of the inputted image data, or the region expressed by the width of the nozzle pitch (the sub-scanning direction)×the printing width (the main scanning direction). If a positive determination is made in Step S92, the processing proceeds to Step S93, where printing is performed while a mask with an equal print allowing rate for the individual passes is applied. On the other hand, if a negative determination is made, the processing proceeds to Step S94, printing is performed while a mask with an unequal print allowing rates for the individual passes is applied. Being equal or unequal print allowing rate for the individual passes herein means that print allowing rates of the masks applied to all passes are equal or unequal (i.e., different) in a certain region (nozzle complementary width) in which printing is performed complementary a plurality of times.

After printing is performed as described above, in Step S95, the printing medium is discharged (discharge of paper) and the processing is completed.

Since the printing operation in Step S93 is the conventionally conducted processing, the detailed explanation will be omitted. Accordingly, Step S94 which is a major portion of the present embodiment will be described more specifically with reference to FIGS. 4, 5A, 5B and 6A to 6E. In Step S94, the inputted image data is divided into the image data corresponding to m pieces of rasters continuing in the sub-scanning direction. The data processing conducted in the dividing process features the present embodiment.

Figure 4:
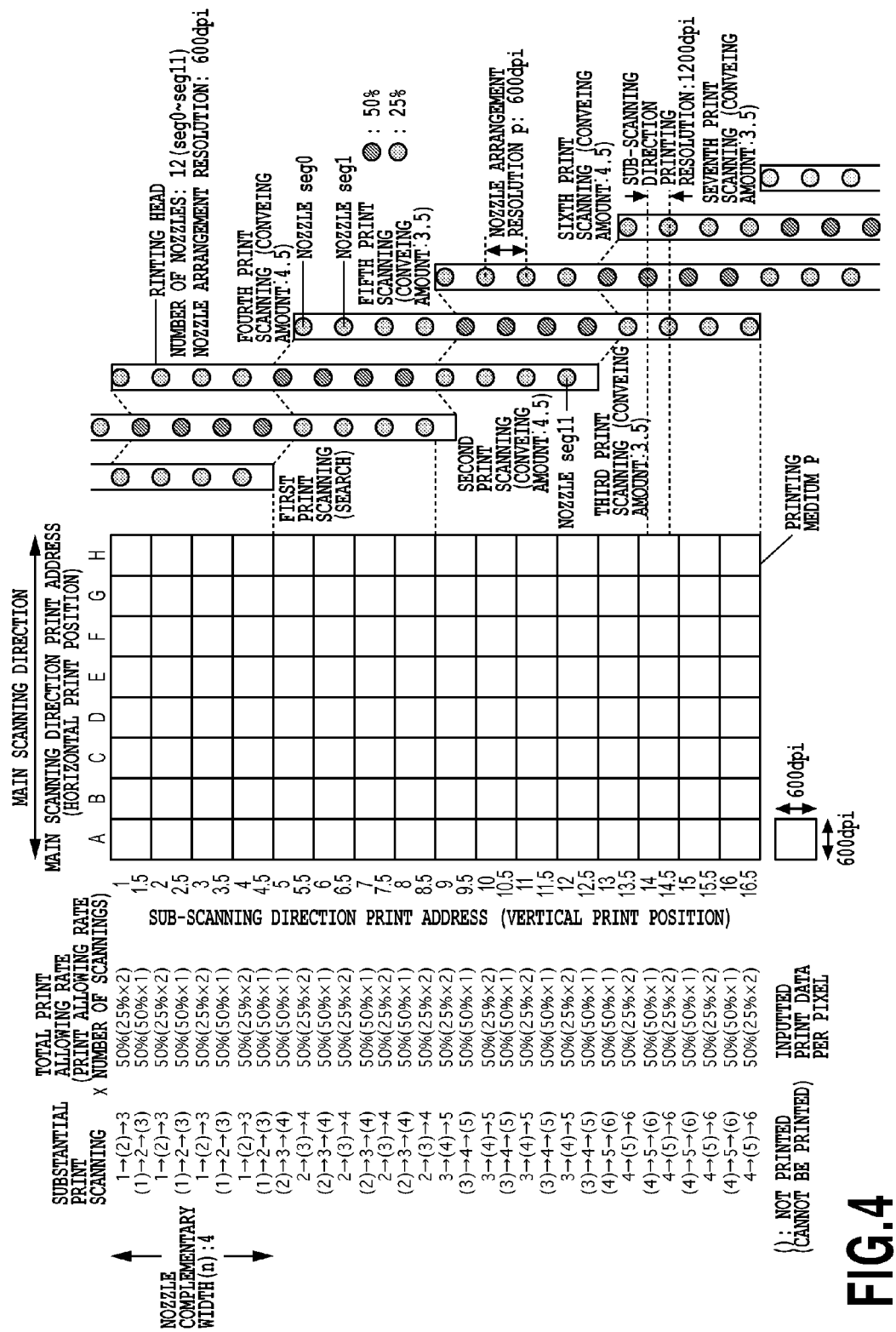
FIG. 4 is an explanatory view for explaining one example of a printing operation in the case where Embodiment 1 is applied.
Figure 21:
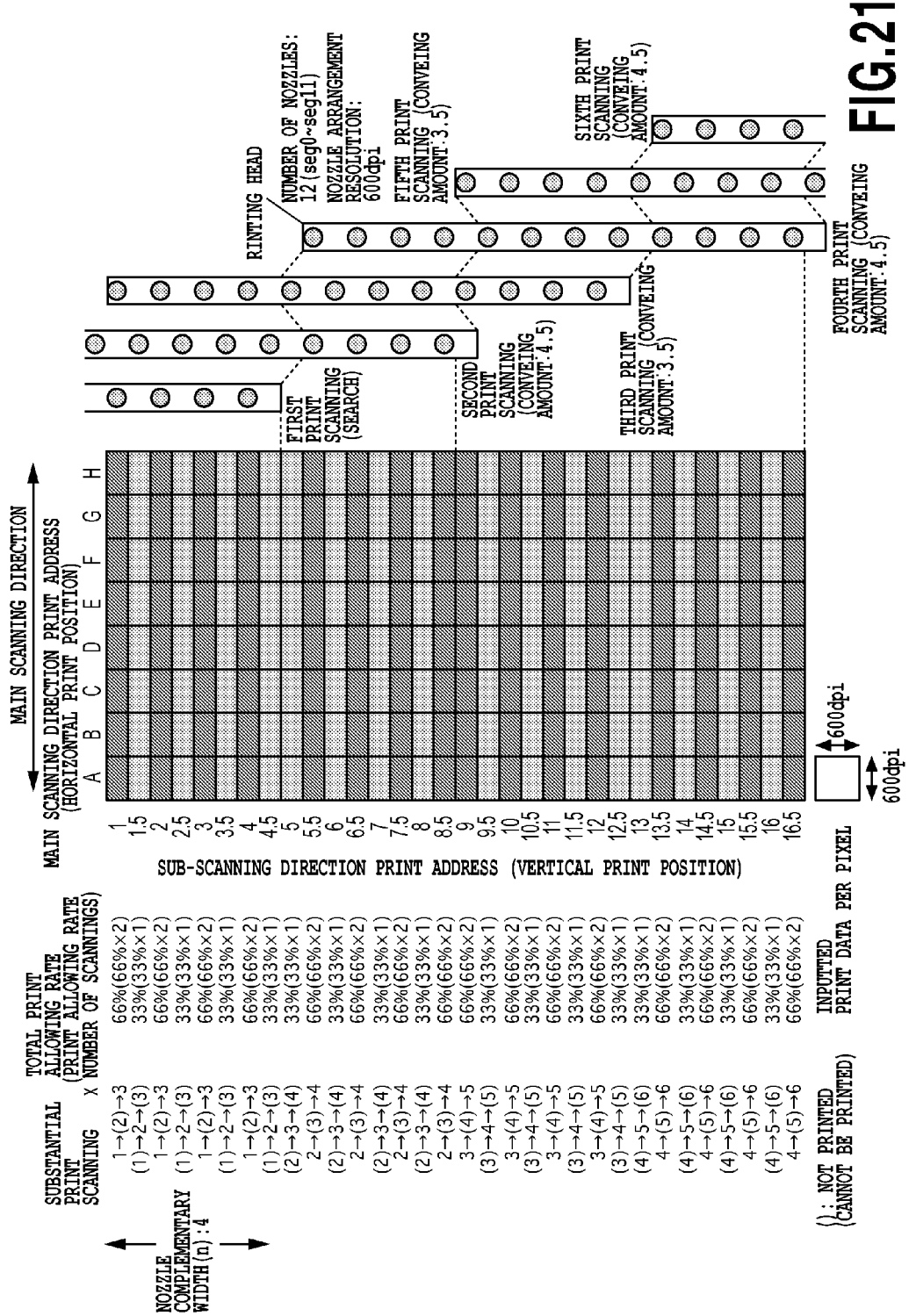
FIG. 21 is an explanatory view showing a problem which occurs in the case where the multipass printing and the interlace printing are used together.

FIG. 4 is an explanatory view showing how the problem described in FIG. 21 is solved by the present embodiment, and FIGS. 5A, 5B, and 6A to 6B are schematic views for explaining a mask used in the present embodiment shown in FIG. 4.

As is the case with FIG. 21, FIG. 4 shows a case of printing the same input data in the 3-passes printing while setting the number of divisions m=2, with use of a printing head in which 12 nozzles (seg 0 to seg 11) are arranged at a density of 600 dpi. In this case, the printing medium is conveyed by the amounts equivalent to p×3.5 and p×4.5. However, in the present embodiment, the mask to be applied is different from a mask applied in FIG. 21. To be more precise, the printing is performed using a mask in which the number of substantial print scannings is taking into consideration so as to make the sums of print allowing rates (total print allowing rates) for the respective divided rasters equal to each other. That is, the total print allowing rate for a raster is determined by the number of divisions, m, and if m=2, the total print allowing rate should be 50%. The nozzles shown in dark gray in this diagram mean that a mask with 50% is applied to the nozzles, and nozzles shown in light gray means that a mask with 25% are applied to the nozzle. Use of such masks enables making the total print allowing rate to be 50% on the printing medium P without depending on a vertical print position (raster).

Figure 5A:
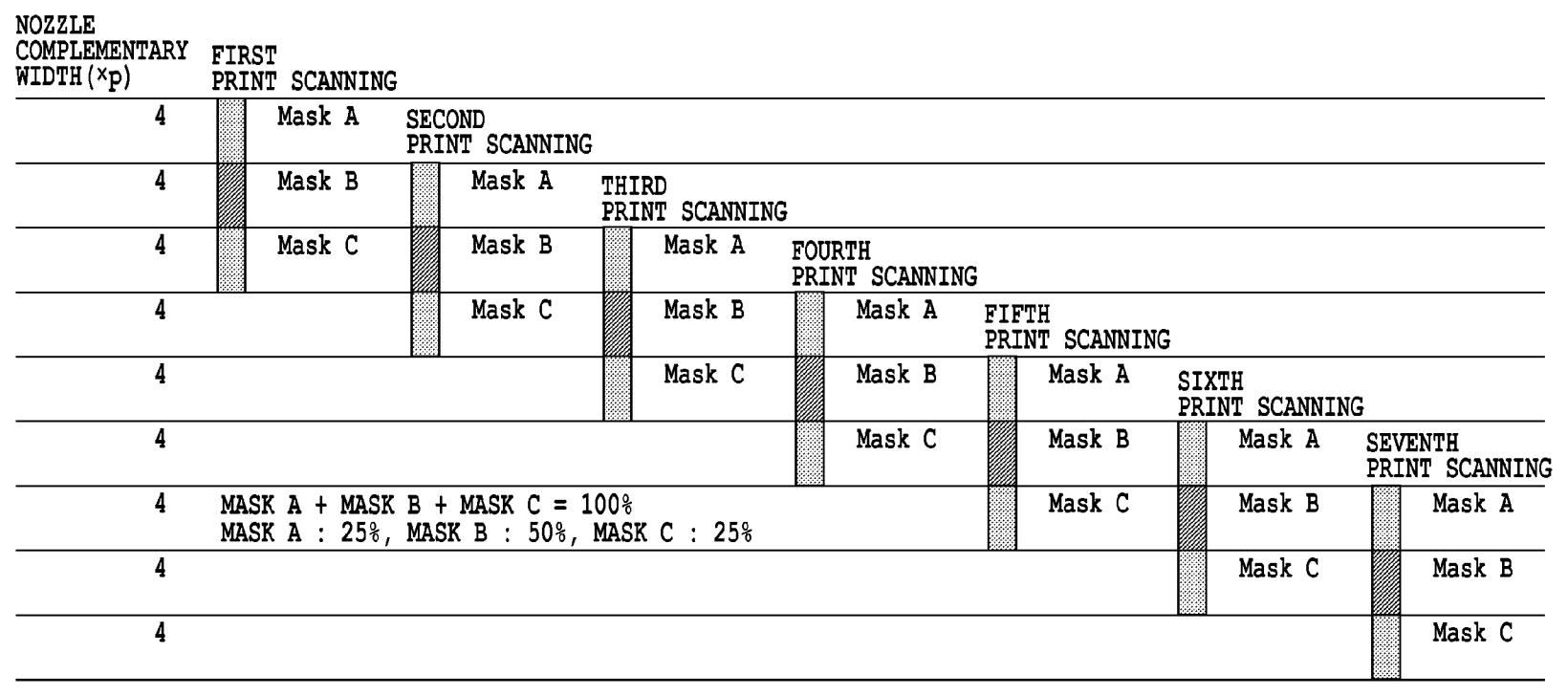

FIG. 5A is an explanatory view for explaining what masks are used for a nozzle within a nozzle complimentary width. Specifically, FIG. 5A shows that printing is performed by applying MASK A, MASK B and MASK C to each nozzle complementary width, that is, to each of 4 nozzles. MASK A, MASK B and MASK C are in a complementary relationship. That is, in a single print scanning (for example, a third print scanning), MASK A is applied to the nozzles seg 0 to seg 3, MASK B is applied to the nozzles seg 4 to seg 7, and MASK C is applied to the nozzles seg 8 to seg 11. "Being in a complementary relationship" means that the inputted image data can be reproduced without excess or deficiency when using all masks that satisfy the relation that the total of a print allowing rates for MASK A, MASK B and MASK C equals to 100%. Further, in the present embodiment, the number of substantial print scannings for the same vertical print position is taken into consideration, a print allowing rates for MASK A, MASK B and MASK C are set to 25%, 50% and 25% respectively. For example, as for the region where printing is performed with use of MASK C (with a print allowing rate of 25%) in the first print scanning, it is understood that printing is performed by applying MASK B (with a print allowing rate of 50%) in the second print scanning and applying MASK A (with a print allowing rate of 25%) in the third print scanning. In other words, the diagram shows that the print allowing rates of the masks used for the individual print scannings are unequal (different). By making the print allowing rates unequal as described above, the total print allowing rate for the individual rasters can be made equal.

Figure 5B:
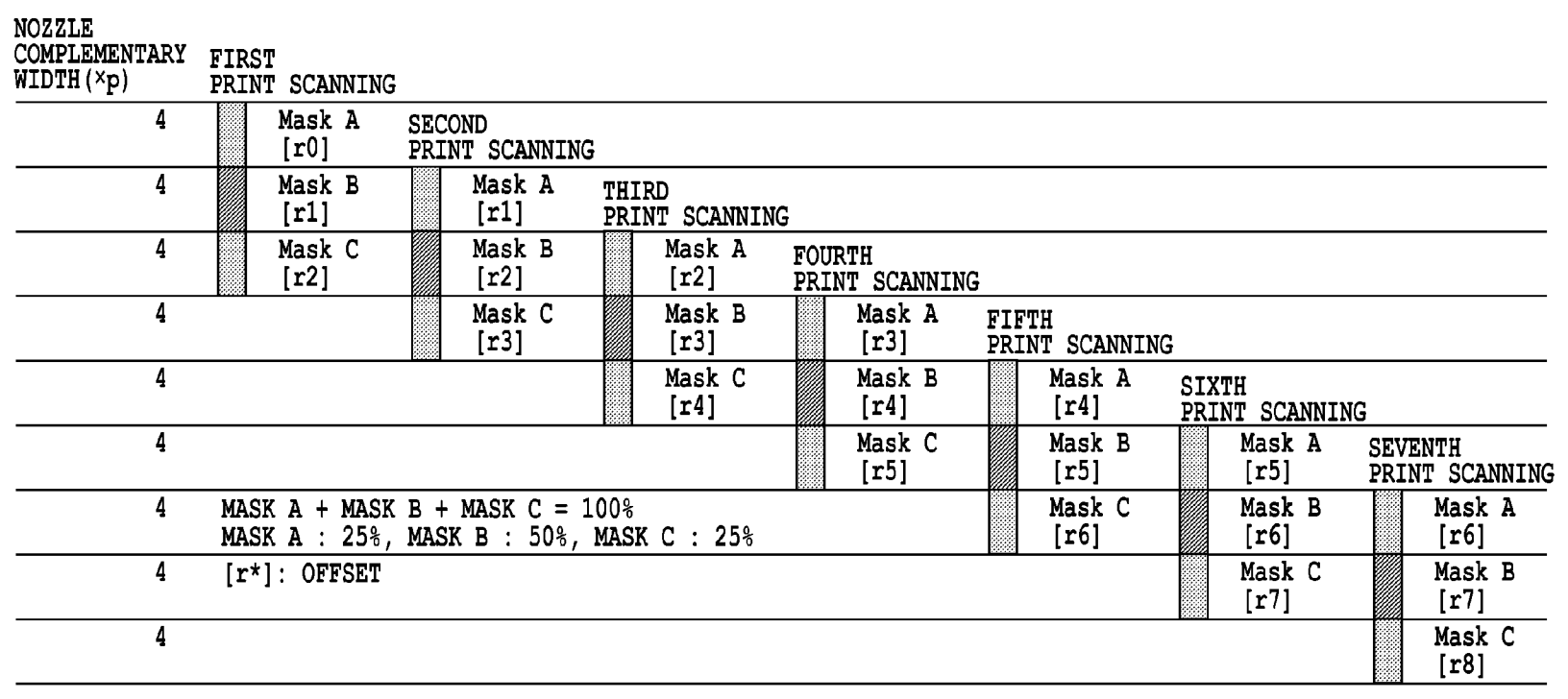

In FIG. 5A, MASK A, MASK B, and MASK C with the predetermined print allowing rates are repeatedly used in a fixed manner. Other than this, the masks be applied as shown in FIG. 5B. Specifically, the read-out start positions of the mask data for each of MASK A, MASK B, and MASK C are offset (shifted) to such as r1, r2, r3 . . . , whereby the mask data for each mask may be applied cyclically. This mask application makes it possible to prevent image quality deterioration such as periodic appearance of the mask pattern on the print image, which deterioration may be observed in the case where the same mask is fixedly applied. Alternatively, the masks may be created for each scanning. This is also true for processing which will be described later with reference to FIGS. 7A, 7B, 8A, and 8B.

Figure 6A:
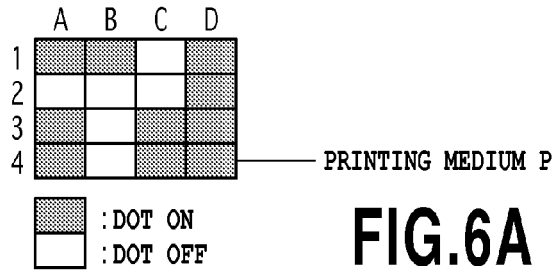
FIGS. 6A to 6E are explanatory views for explaining a series of processing executed to inputted image data in Embodiment 1.

A series of processing on the actual inputted image data will be described with reference to FIGS. 6A and 6B. FIG. 6A shows one example of the inputted image data, FIG. 6B shows mask data, FIG. 6C shows print data for each scanning, FIG. 6D shows nozzle positions, and FIG. 6E shows a result outputted on the printing medium in accordance with the inputted image data in FIG. 6A.

FIG. 6A shows the inputted image data corresponding to vertical positions 1 to 4 and horizontal positions A to D of the printing medium P. Herein, the dots are printed at the positions shown in gray (A1, B1, D1, D2, A3, C3, D3, A4, C3, D4), and the dots are not printed at the positions shown in white (C1, A2, B2, C2, B3, B4).

Figures 6B, 6C, 6D:
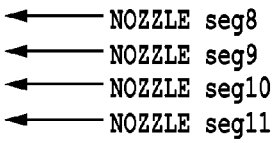
Figure 6E:
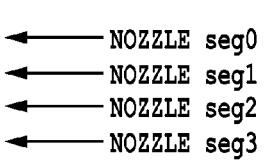

In the case of the mask data of FIG. 6B, the inputted image data at the positions described as "1" are allocated to the corresponding nozzle for printing (i.e., the dot printing is allowed), and the inputted image data at the positions described as "0" are not printed (i.e., the dot printing is not allowed). Herein, in MASK A shown in the portion (b-3) of FIG. 6B, "1" is set in 4 grids A1, C2, B3 and D4 out of the total 16 grids expressed by vertical 1 to 4 and horizontal A to D. That is, a print allowing rate will be 4/16=25%. For MASK B (the portion (b-2) of FIG. 6B) and MASK C (the portion (b-1) of FIG. 6B), a print allowing rates are calculated as 50% and 25% in a similar manner, respectively.

The processing in the case of printing the inputted image data (inputted print data) provided in FIG. 6A is as follows.

First, MASK C shown in (b-1) of FIG. 6B is applied to the inputted image data (FIG. 6A) (AND processing is executed). That is, the inputted image data is thinned out with use of MASK C. As a result, only the inputted image data at the positions where "1" is set in MASK C can be printed in the first print scanning. Therefore, the data at the positions shown in gray of (c-1) of FIG. 6C (the data for A1 and D4) should be printed in the first print scanning. In FIG. 6D, the nozzle positions which are used at this time are shown. In other words, the data at the position A1 is printed by the nozzle seg 8, and the data at the position D4 is printed by the nozzle seg 11.

In the similar manner, MASK B (the portion (b-2) of FIG. 6B) is applied in the second scanning. As a result, the data at the position B1 should be printed by the nozzle seg 4, the data at the position D2 should be printed by the nozzle seg 5, the data at the positions C3, D3 should be printed by the nozzle seg 6, and the data at the position A4 should be printed by the nozzle seg 7 (the portions (c-2) and (d-2) of FIGS. 6C and 6D). Further, MASK A (the portion (b-3) of FIG. 6B) is applied in the third print scanning. As a result, the data at the position D1 should be printed by the nozzle seg 0, the data at the position A3 should be printed by the nozzle seg 2, and the data at the position C4 should be printed by the nozzle seg 3 (the portions (c-3) and (d-3) of FIGS. 6C and 6D).

Between the first or third print scanning and the second scanning, the vertical positions are different by the amount equivalent to 0.5 pitch (FIG. 4). Accordingly, the inputted image data in FIG. 6A is outputted on the printing medium as shown in FIG. 6E. As understood from the result, the number of dots printed in the 1st, 2nd, 3rd and 4th rasters in the vertical position is 5 (i.e., the 5 dots at the positions A1, D1, A3, C4 and D4). Meanwhile, the number of dots printed in the 1.5th, 2.5th, 3.5th and 4.5th rasters in the vertical position is also 5 (i.e., the 5 dots at the positions B1.5, D2.5, C3.5, D3.5, and A4.5). In short, it is possible to print the same number of the dots in both cases.

As described above, in the present embodiment, the masks are set by calculating the print accepting rates for the nozzles in the individual print scanning, so that the total print allowing rates of the preceding portion (for example, the 1st raster) and of subsequent portion (for example, the 1.5th raster) of the division position (the division number m is 2 in the above-described example) become equal. That is, in the above-described example, a print allowing rates of MASK A, MASK B and MASK C should be set to 25%, 50% and 25%, respectively. This makes it possible to prevent the image deterioration that might be caused by printing in which print allowing rates vary among the print positions in the sub-scanning direction while the print positions with different print allowing rates are present at random.

Figure 22:
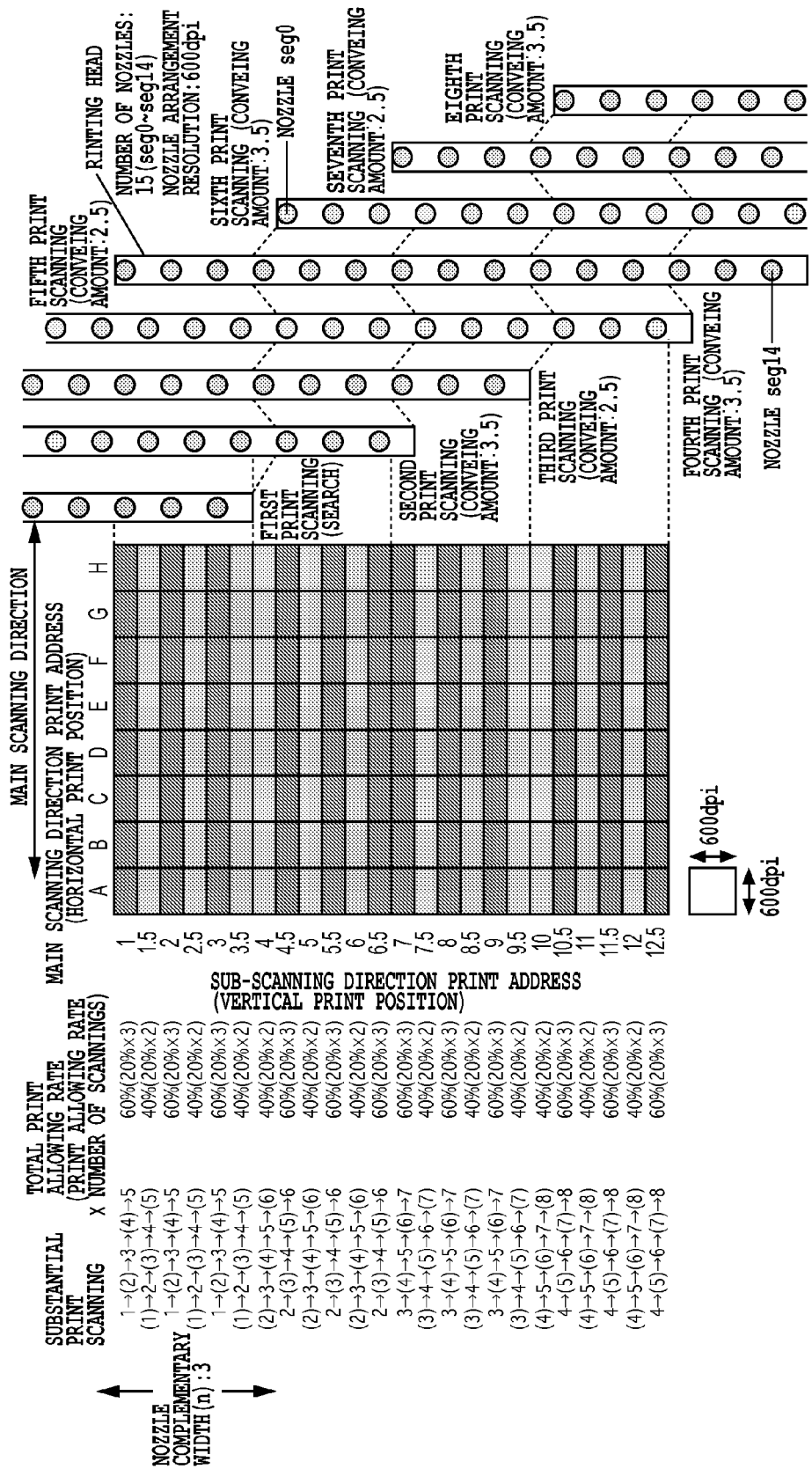
FIG. 22 is an explanatory view showing a problem which occurs in the case where the multipass printing and the interlace printing are used together.

Next, how the problems described in FIG. 22 are solved by the present embodiment will be described.

Figure 7A:
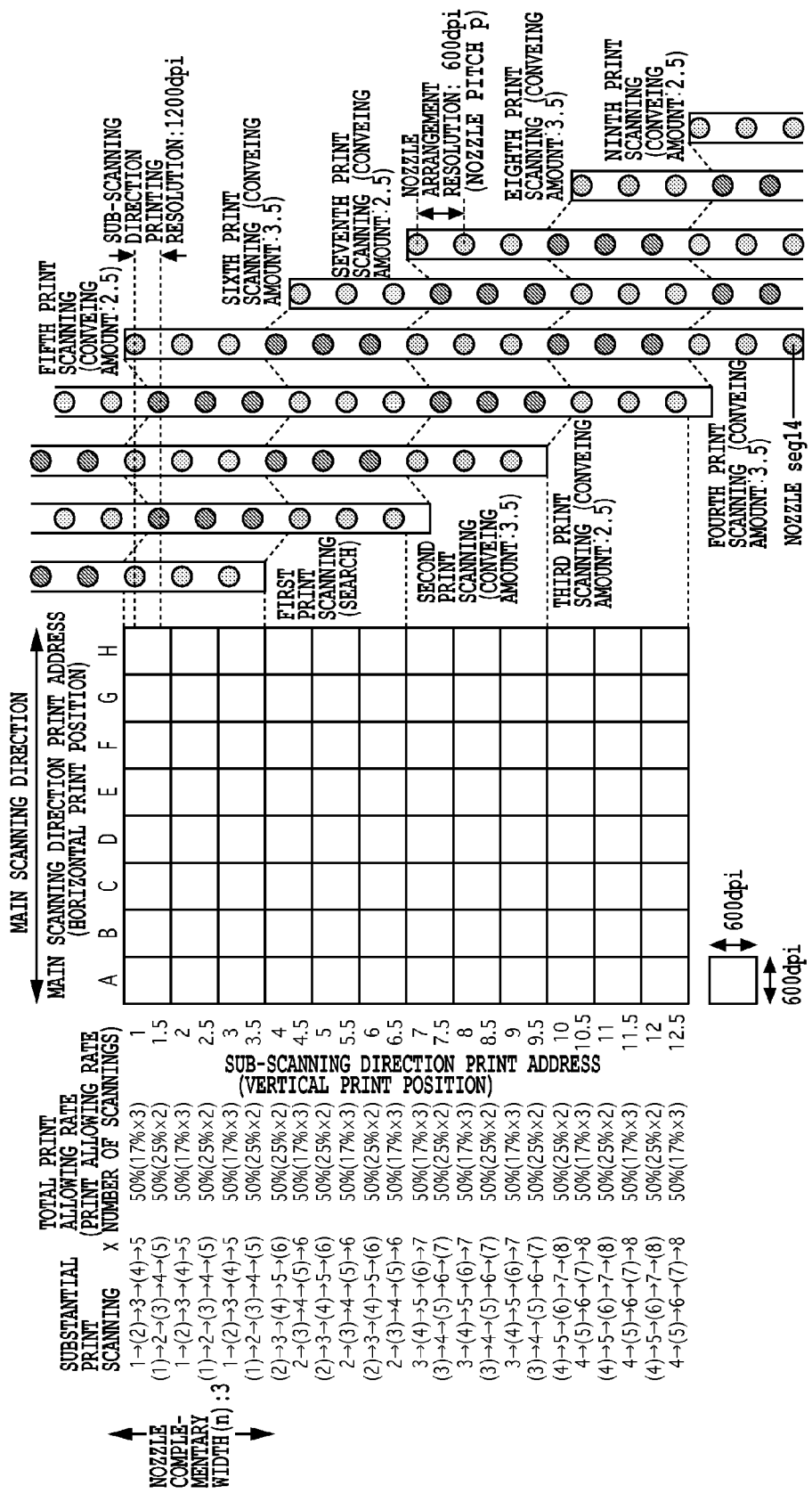
Figure 7B:
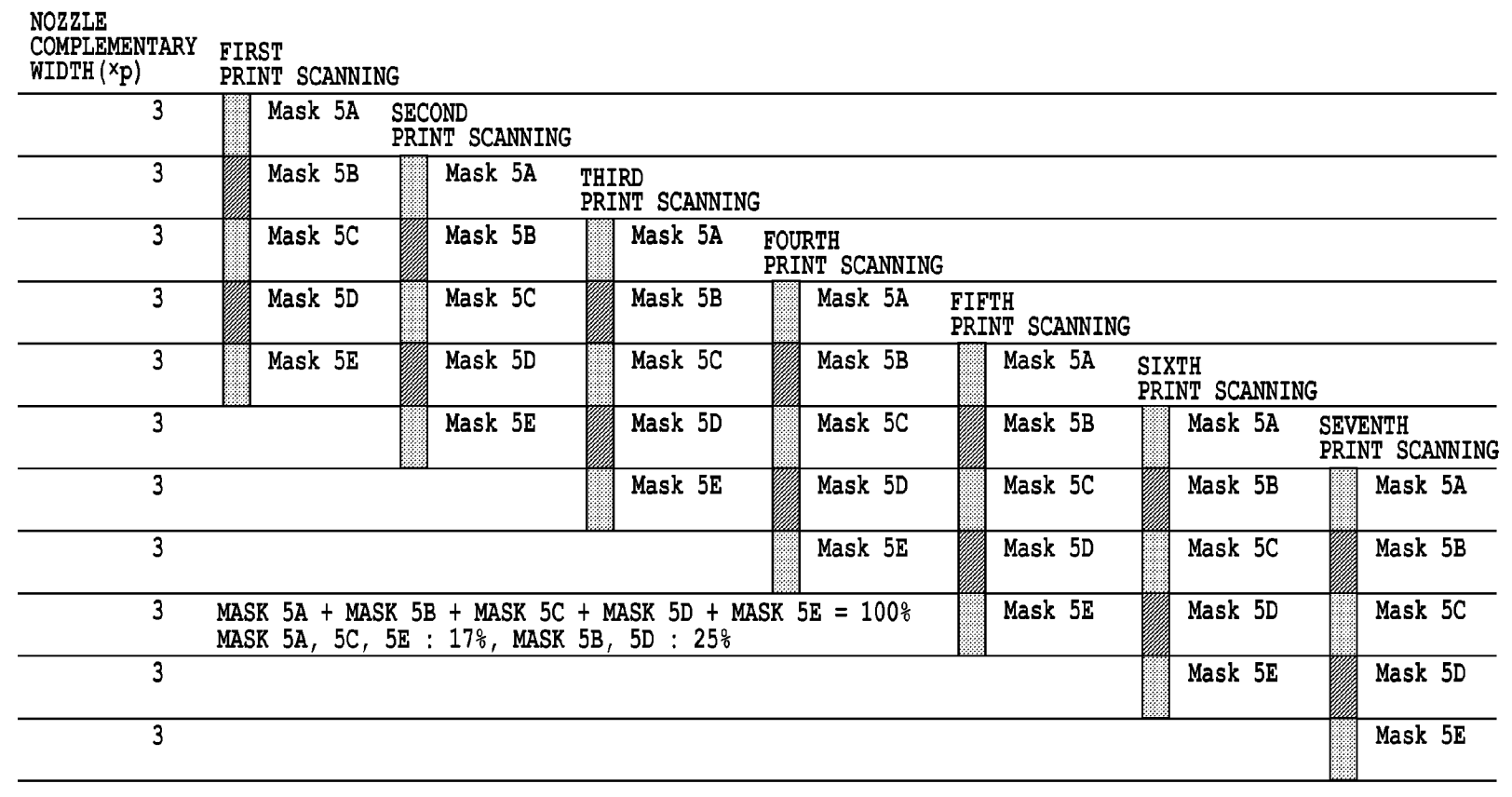

FIGS. 7A and 7B are explanatory views of this. As is the case with FIG. 22, the same input data is printed in the 5-pass printing while setting the number of divisions m=2, with use of the printing head in which 15 nozzles (seg 0 to seg 14) are arranged at a density of 600 dpi. Also in this example, as is the case with the above, the number of divisions m=2. Accordingly, the total print allowing rate for each raster need be 50%. In addition, as shown in FIG. 7A, the printing medium is conveyed by the amounts equivalent to p×2.5 and p×3.5. Accordingly, the position of the rasters in which the number of substantial print scannings is 3, and the positions of the rasters in which the number is 2 are recognized.

Accordingly, as shown in FIG. 7B, the masks with a print allowing rates of 17% (MASK 5A, MASK 5C and MASK 5E) are applied to the rasters in which the number of substantial print scannings is 3 for each nozzle complementary width. On the other hand, the masks (MASK 5B, and MASK 5D) with a print allowing rates of 25% may be applied to the rasters in which the number of substantial print scannings is 2.

Figure 8A:
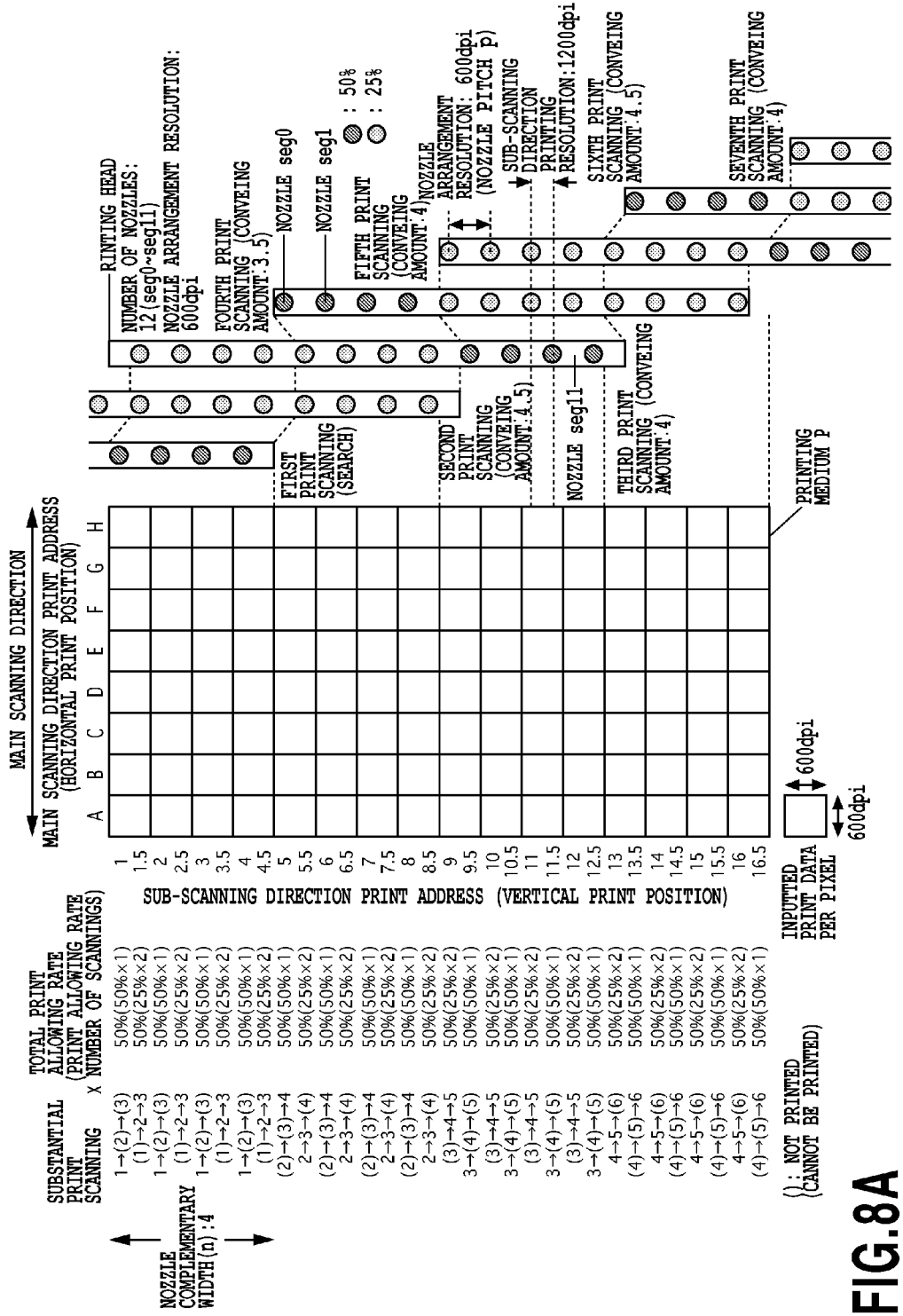

The mask is determined based on the relation between the number of divisions and the conveying amount for each print scanning. Therefore, it should be natural that different masks will be used if the conveying amounts are different. Herein "different" means that a print allowing rates or allocation of masks to the nozzle complementary width are different. For example, even in the case where the number of print passes and the number of divisions are set to be the same as those in FIG. 4 (N=3, m=2), if the conveying amount is set as repetition at p×4.5, p×4, p×3.5, and p×4, masks that are different from the masks used in FIG. 4 are needed. Specifically, as shown in FIGS. 8A and 8B, a print allowing rates can be set equally, by setting the masks so that the total print allowing rates are equal for the individual division positions.

As described above, according to the present embodiment, the inputted image data to be printed in the unit region is divided into the image data corresponding to m (in this example, m=2) pieces of rasters that continue in the sub-scanning direction. At this time, in the case where the number of scannings N (in this example, N=3 or N=5) for the unit region is not an integral multiple of the number of divisions m (in this example, m=2), the above-described image data is divided so that the dots are arranged in the above-described m rasters at a substantially equal rate. As a result of this, unevenness of concentration shown in FIGS. 21, 22 or the like can be reduced.

Embodiment 2

In the above-described Embodiment 1, the case where the number of divisions=2 was described. However, the present invention may also be applied to a case where the number of divisions other than 2 is used. In the present embodiment, a case where the number of divisions=3 is illustrated. Note that the processing procedure shown in FIG. 3 can be employed also in the processing procedure of the present embodiment.

Figure 9B:
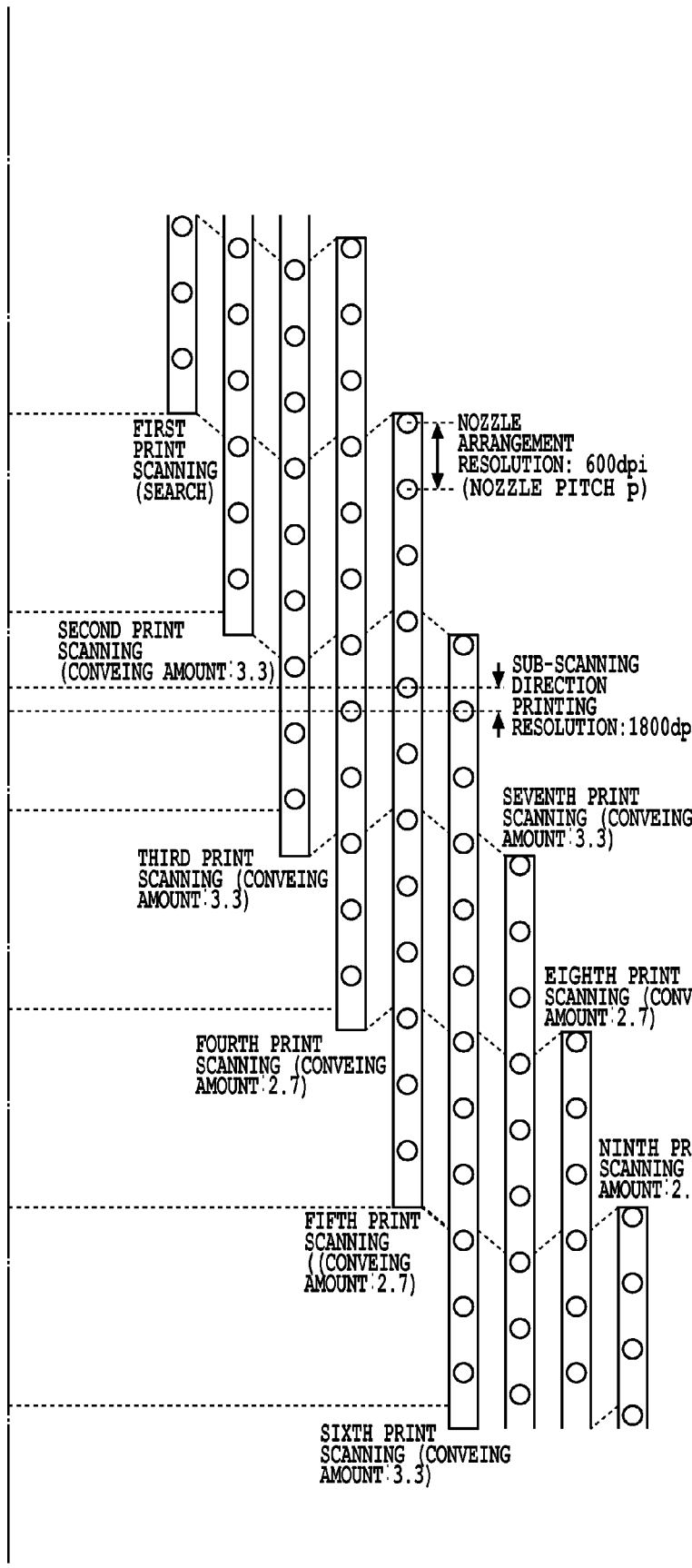
FIG. 9B is an explanatory view for explaining the problem which Embodiment 2 of the present invention addresses.

FIGS. 9A and 9B show a case where the processing is executed without applying the present invention, in the case where the number of divisions=3. Herein, the number of passes N=4, the nozzle complementary width=p×3, and the conveying amounts are set to the repetition of p×3.3, p×3.3, p×2.7, and p×2.7. In this case, as apparent from FIGS. 9A and 9B, 2 types of regions with different total print allowing rates 50% and 25% should exist.

Figure 10B:
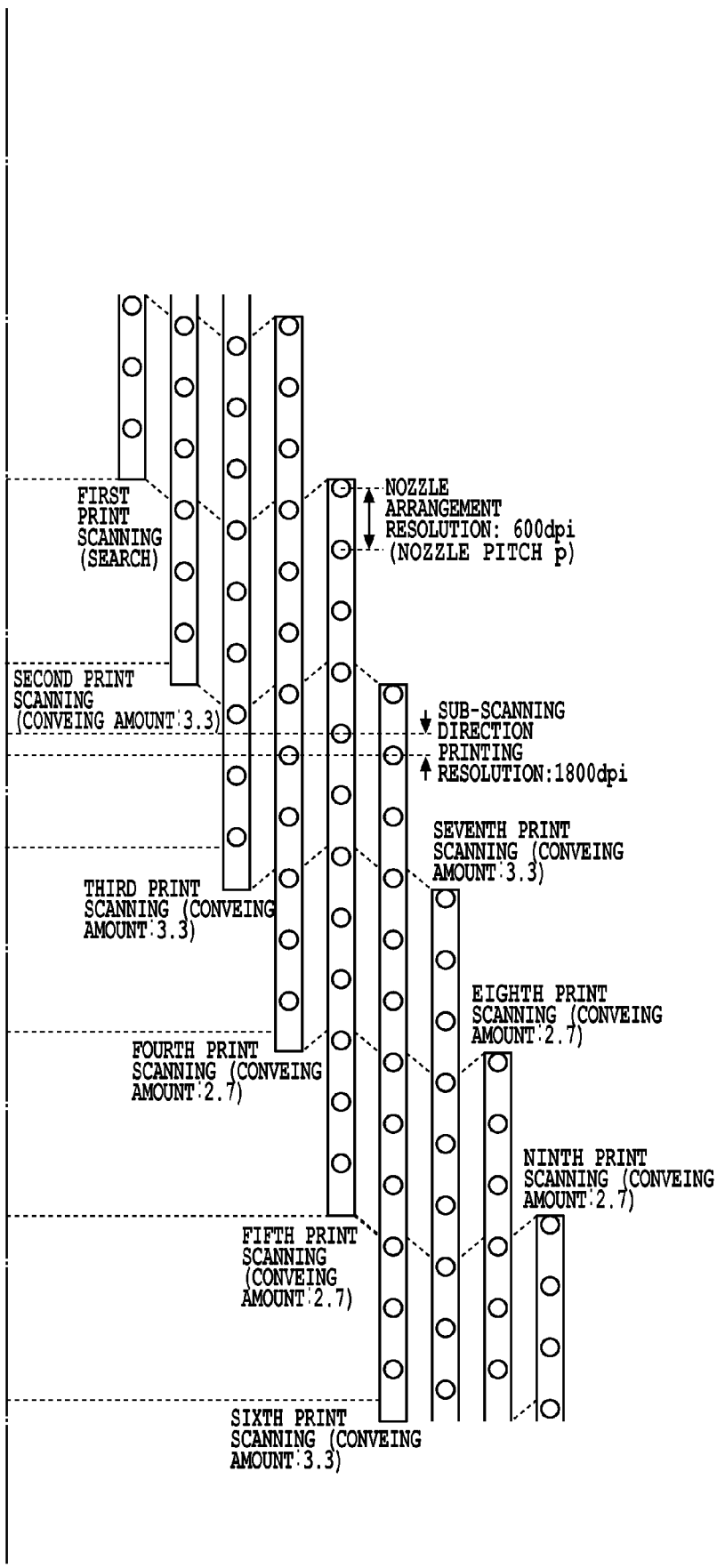
FIG. 10B is an explanatory view for explaining the example of the printing operation in the case where Embodiment 2 is applied.

On the other hand, FIGS. 10A and 10B shows a case where the processing is executed by applying the present invention. In FIGS. 10A and 10B, as is the case with Embodiment 1, the print allowing rate for the nozzle in each print scanning is calculated based on the total print allowing rate after division (33% at each vertical position) and the number of print scanning at the same vertical position. As a result of this, the total print allowing rate can be kept constant (33%).

FIG. 11 is a schematic view of the masks at this time. As apparent from the drawing, it is possible to make the total print allowing rates equal, by using masks with print allowing rates of 33%, 17%, 33% and 17% for the first, second, third and fourth print scannings, respectively. In the present embodiment, unlike Embodiment 1, it is understood that masks with the same print allowing rates are applied to all nozzles for each print scanning, in order to keep the total print allowing rate constant. At this time, as is the case with FIG. 5B, the read-out start positions of the mask data for each of MASK 4A to MASK 4D are offset in such a way as r1, r2, r3 . . . , whereby the mask data of each mask can be cyclically applied.

As described above, according to the present embodiment, the inputted image data to be printed in the unit region is divided into the image data corresponding to m (in this example, m=3) pieces of rasters which continue in the sub-scanning direction. At this time, in the case where the number of scanning N (in this example, N=4) for the unit region is not an integral multiple of the number of divisions (in this example, m=3), the above-described image data is divided, so that the dots are arranged in the above-described m rasters at a substantially equal rate. As a result of this, unevenness of density shown in FIGS. 21, 22 or the like can be reduced.

Embodiment 3

Figure 12:
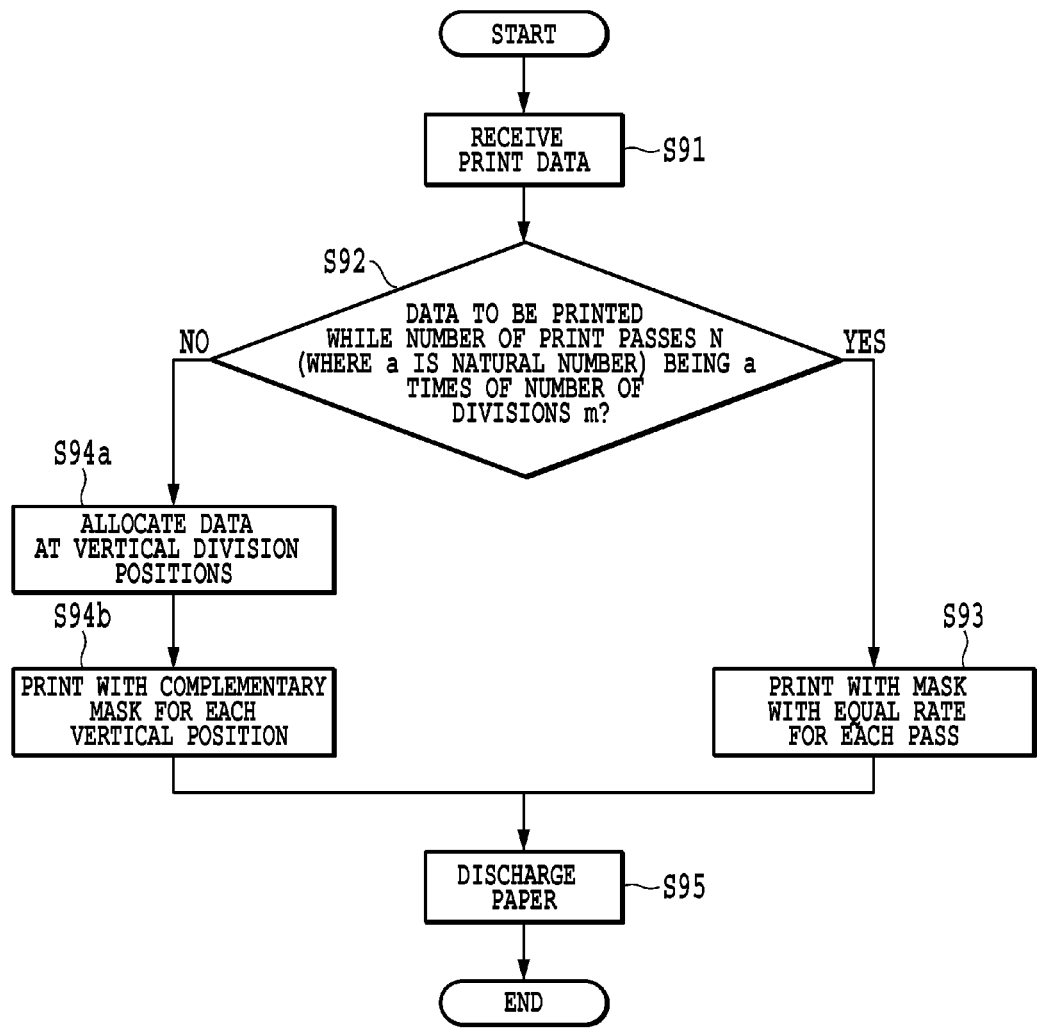
FIG. 12 is a flow chart showing an example of a processing procedure executed in Embodiment 3 of the present invention.

FIG. 12 is a flowchart showing an example of the processing procedure conducted in Embodiment 3 of the present invention. Herein, the processing steps similar to those shown in FIG. 3 are provided with the same step reference numbers, and the explanation thereof will be omitted. The difference of the present procedure from the processing procedure in FIG. 3 is the processing in Steps S94$a$ and S94$b$ which is executed if a negative determination is made in Step S92.

In Step S94$a$, the print data (inputted image data) received from the external device is converted in accordance with the number of divisions as shown in FIG. 13. Herein, a case where the number of divisions=2, the number of print passes N=3, and the nozzle complementary width n=the nozzle pitch p×3 is illustrated.

Figure 13A:
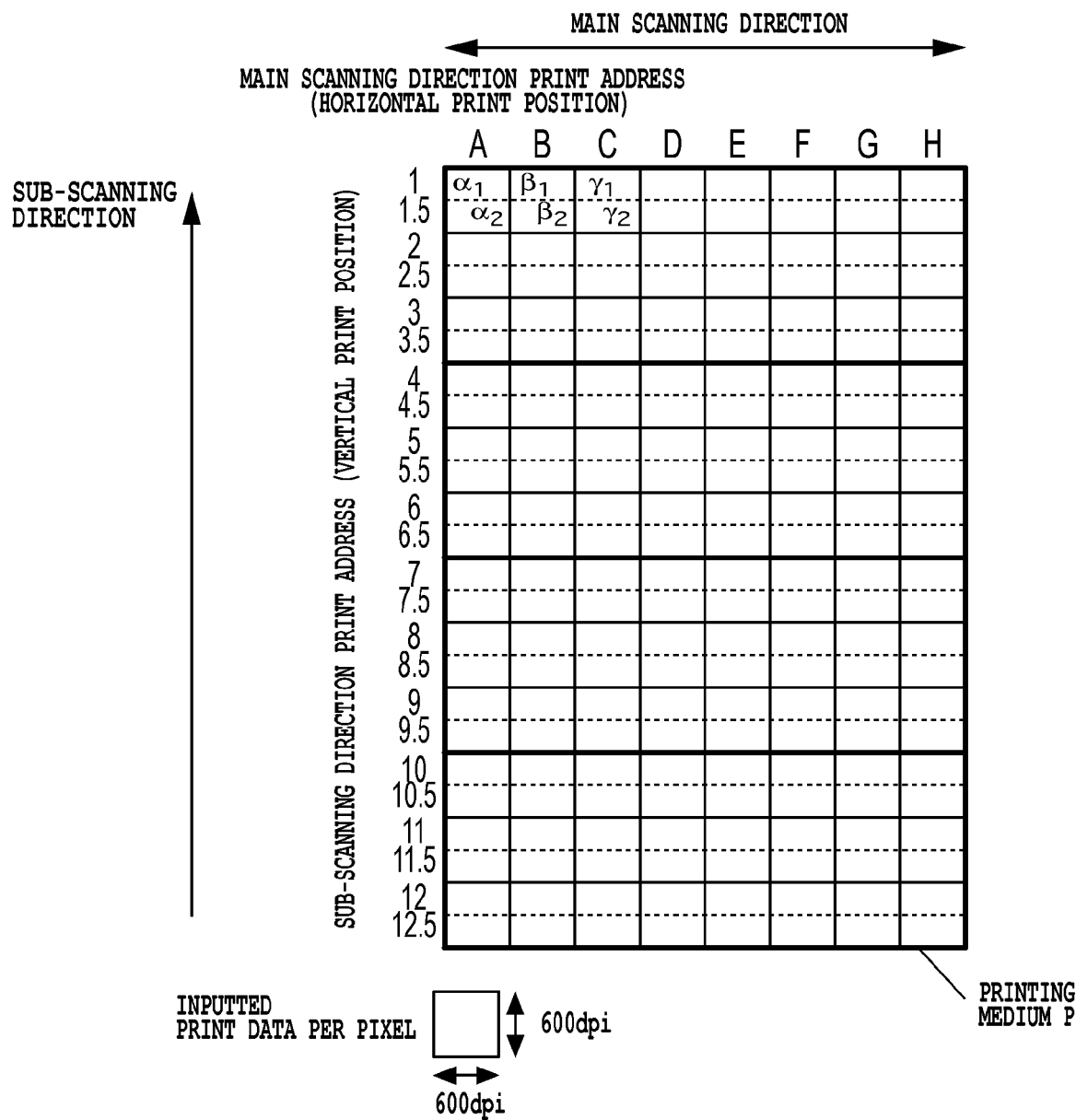
Figure 19:
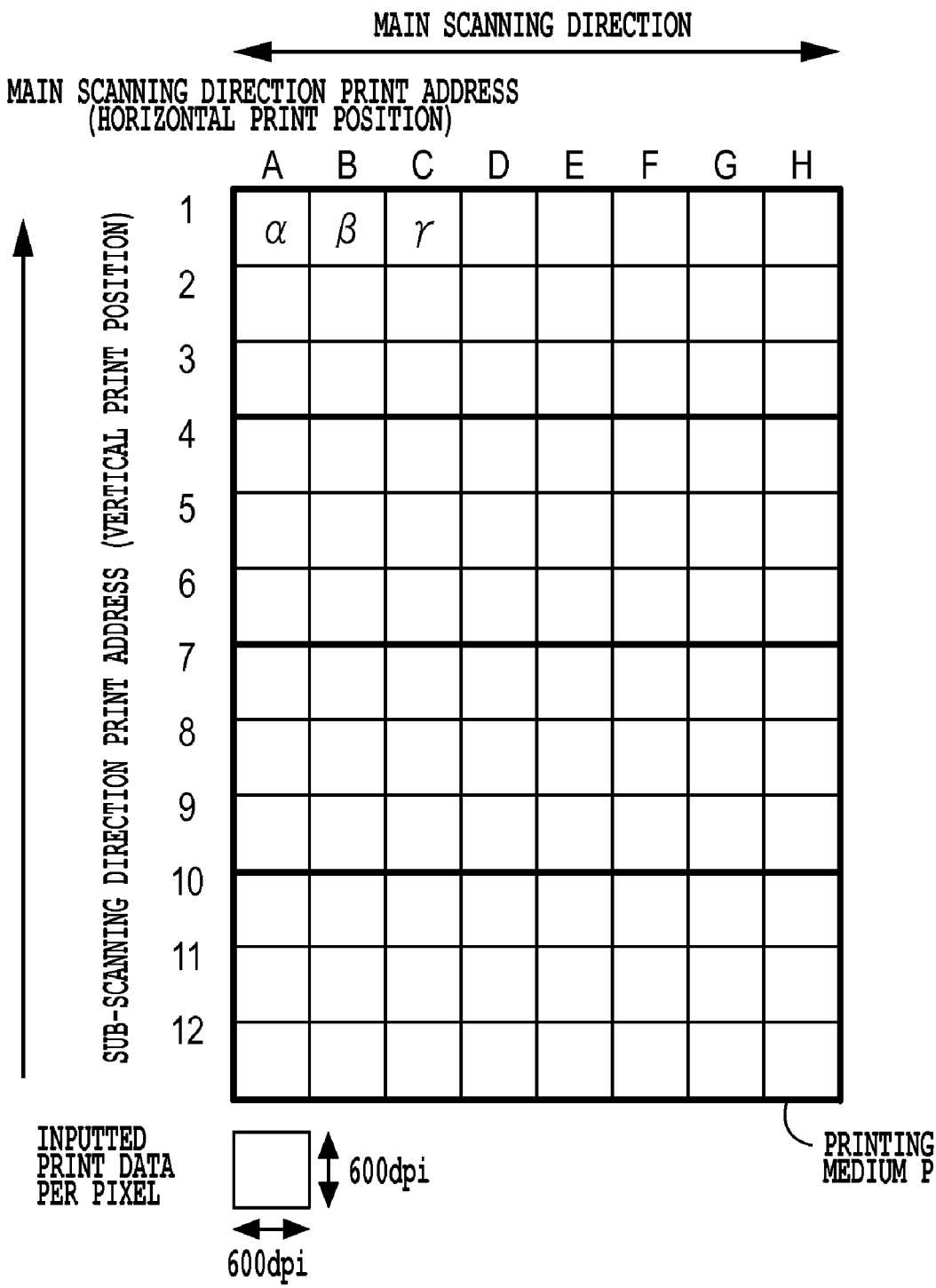
FIG. 19 is an explanatory view of the inputted image data which is generated corresponding to a nozzle pitch (nozzle array resolution)
Figure 20A:
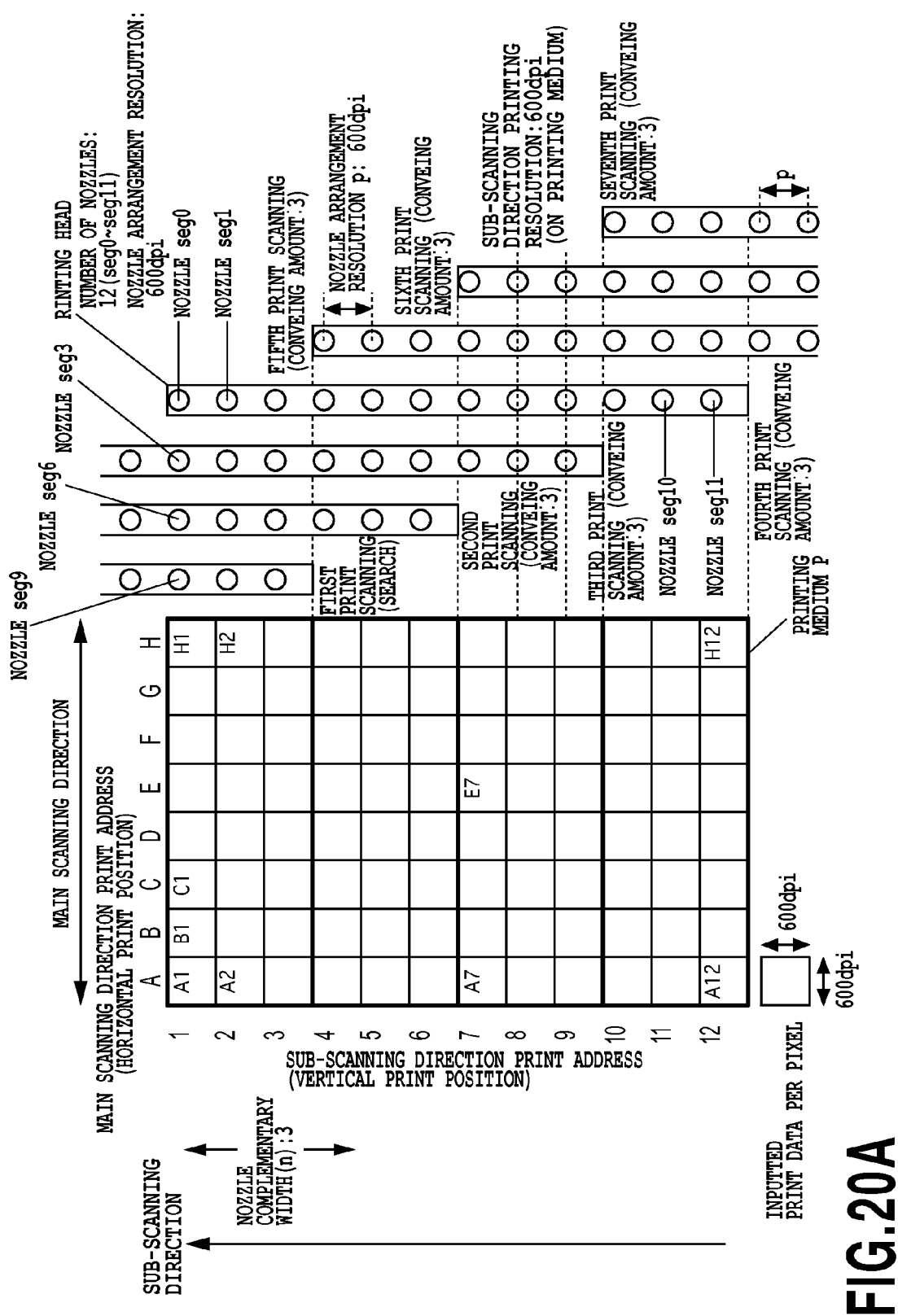
FIGS. 20A and 20B are explanatory views respectively showing the case where the multipass printing is applied to the inputted image data shown in FIG. 19 and the case where the interlace printing is further applied to it.
Figure 20B:
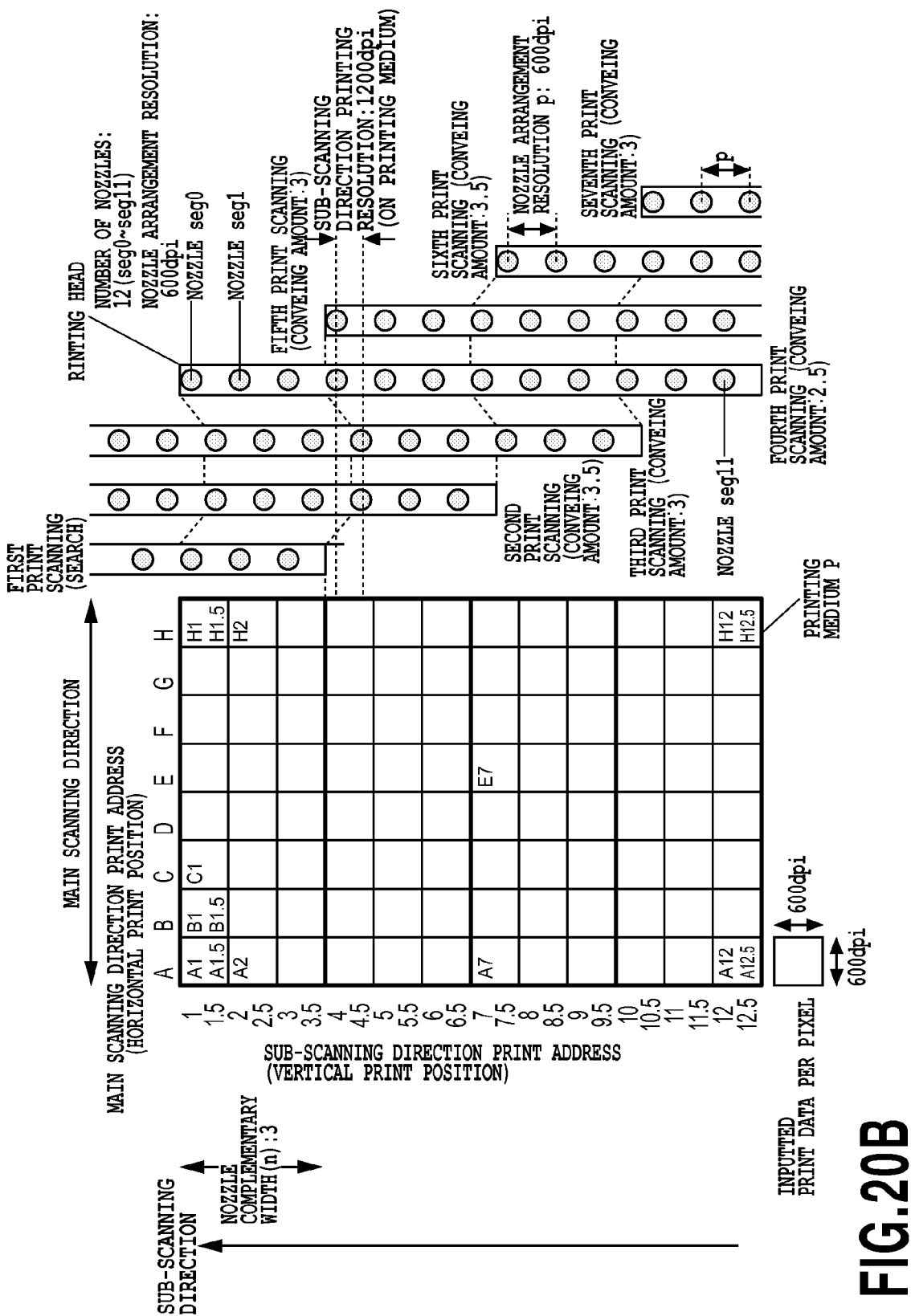

FIG. 13A is a diagram showing the print data after the inputted image data described in FIG. 19 is converted and developed in Step S94$a$. Herein, the number of divisions=2. Therefore, as shown in FIG. 13A, the inputted image data α, β, γ at the pixel positions A1, B1, C1 in FIG. 19 are respectively converted to α1, β1 and γ1 for the 1st raster of the outputted print data, and α2, β2 and γ2 for the 1.5th raster thereof. Of course, during this conversion, the number of the printed dots should not be changed. Specifically, the conversion processing as follows is executed.

In FIG. 13B, the inputted image data is shown in the portion (b-1), and the print data after conversion is shown in the portion (b-2). The conversion processing is executed for each raster (i.e., for each vertical position). That is, the inputted image data at the vertical positions 1 to 4 are sequentially conversion-processed. The present embodiment employs the method (data-by-data conversion) of converting data so that data is alternately allocated to the 1st raster and to the 1.5th raster whenever data appears. However, the method is not limited to this. A conversion of allocating the data in accordance with the print position in the horizontal direction (position-by-position conversion) may be executed, or a conversion of allocating data randomly (random conversion) may be executed.

In the portion (b-1), the inputted image data to be printed (dot ON) are shown in light gray, and the inputted image data not to be printed (dot OFF) are shown in white. That is, the inputted image data to be printed are those at the pixel positions A1, B1, D1, D2, A4, C3, D3, A4, C4, and D4. The data-by-data conversion processing is executed on such data so as to develop the data, with the number of divisions=2, that is, the dots are equally allocated to the outputted print data position expressed by an integer and to the outputted print data position expressed by (an integer+0.5).

The portion (b-2) shows the conversion or development result. Since data-by-data conversion is executed in the present embodiment, first, the data at the input position A1 is arranged at the output position A1. The data at the input position B1 to be printed next is arranged at the output position B1.5 in accordance with the data-by-data conversion rule. As a result of similar conversion, the data to be printed should be arranged at the output positions D1, D2.5, A3, C3.5, D3, A4.5, C4, and D4.5.

As described above, the inputted image data is converted and developed to the outputted print data in Step S94a, and then in Step S94b printing is performed by applying the mask for complementary purpose for each raster.

In the above-described Embodiments 1 and 2, the inputted image data is treated as the data with a vertical resolution of 600 dpi. On the other hand, in the present embodiment, the data is treated as the data with a vertical resolution of 1200 dpi because of conversion of the inputted image data. Accordingly, the total print allowing rate need not be equally allocated by the mask across the divided rasters.

Figure 14A:
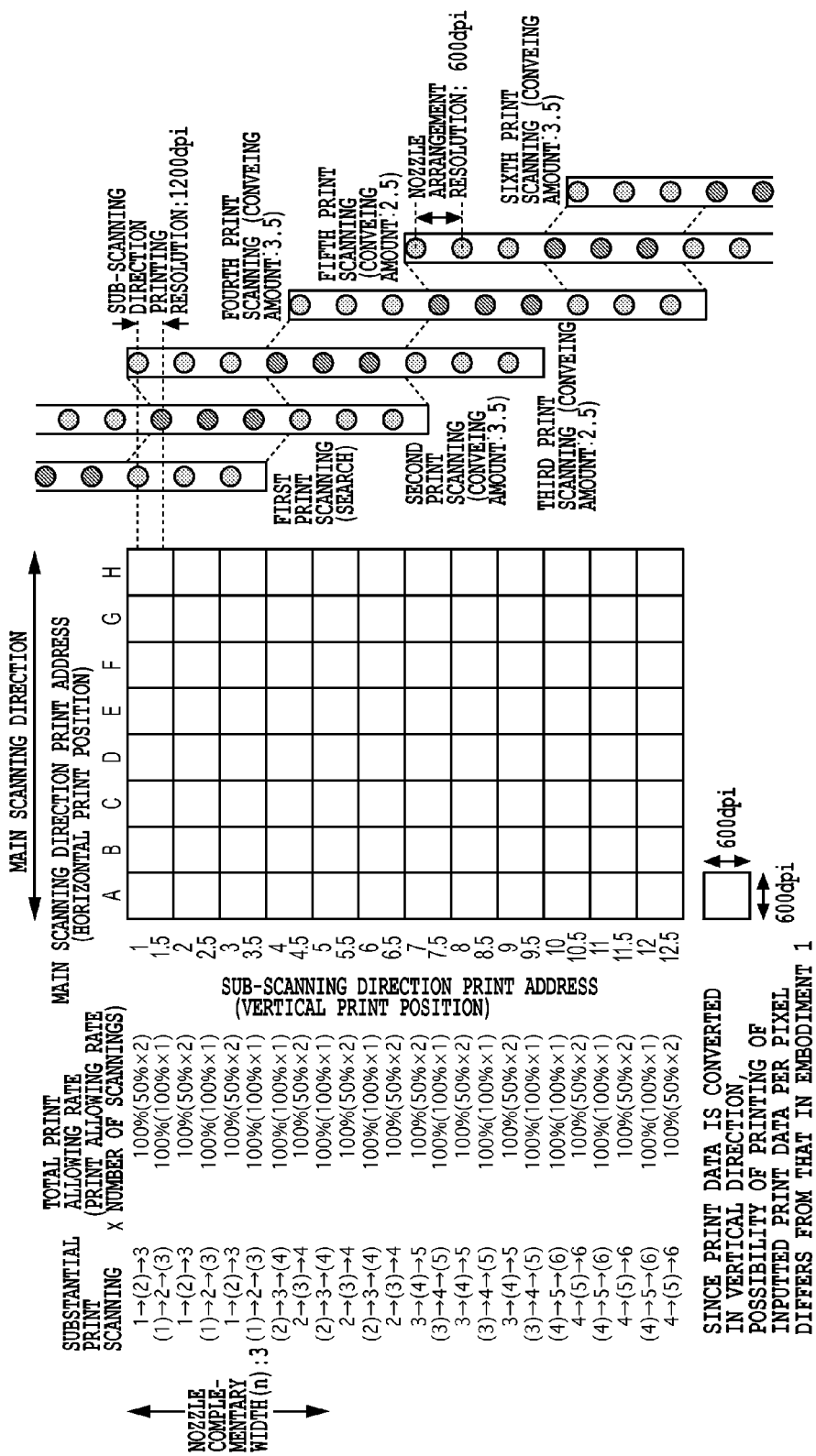
Figure 14B:
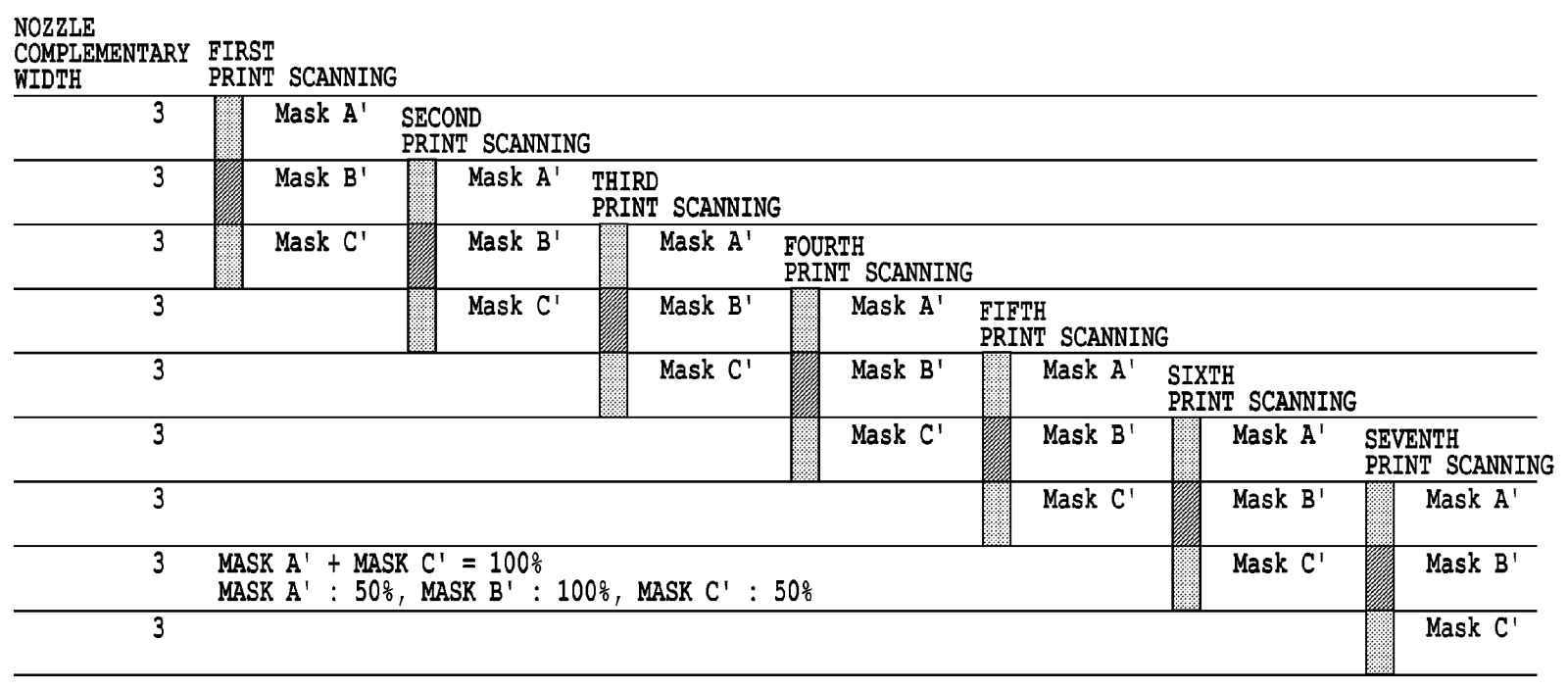

Accordingly, as shown in FIG. 14A, the mask which causes the total print allowing rate for each raster to be 100% should be applied. A schematic view of the mask data assigned to the nozzle is shown in FIG. 14B. In the present embodiment, MASK A' and MASK C' are in a complementary relation. MASK B' has a print allowing rate of 100%, that is, all corresponding print data should be printed.

Note that, in the present embodiment, an example where 1 pixel of the inputted image data corresponds to 1 dot region of the print was described. However, even in the case where it is described that 1 pixel of the inputted image data corresponds to a plurality of dot regions, application of the present embodiment enables different uses of the interlace in accordance with the number of dots, which would be otherwise difficult only with the mask.

FIG. 15 shows print data conversion method in this case. FIG. 15 illustrates the case where 1 pixel of the 600 dpi inputted image data describes that 0, 1 or 2 dots should be printed. Conversion is executed so that the data is arranged only at the vertical positions expressed by the integer when it is described that 1 dot should be printed, and so that the data is arranged both at the positions expressed by an integer and the positions expressed by (integer+0.5) when it is described that 2 dots should be printed. Such conversion makes it possible to appropriately use the interlace functions depending on the number of dots.

Note that, in Embodiment 3, the data conversion processing (Step S94a) is executed in the printing apparatus. However, the conversion processing may be executed by the external device 210 such as a personal computer, and the printing apparatus receives the print data after conversion to perform printing.

<Others>

In the above-described Embodiments 1 and 2, a case where the vertical resolution of the inputted image data is equal to the nozzle array resolution was illustrated. However, even if the nozzle arranging resolution is higher than the vertical resolution of the inputted image data, similar operational effects can be obtained by properly executing the printing operation.

Figure 16:
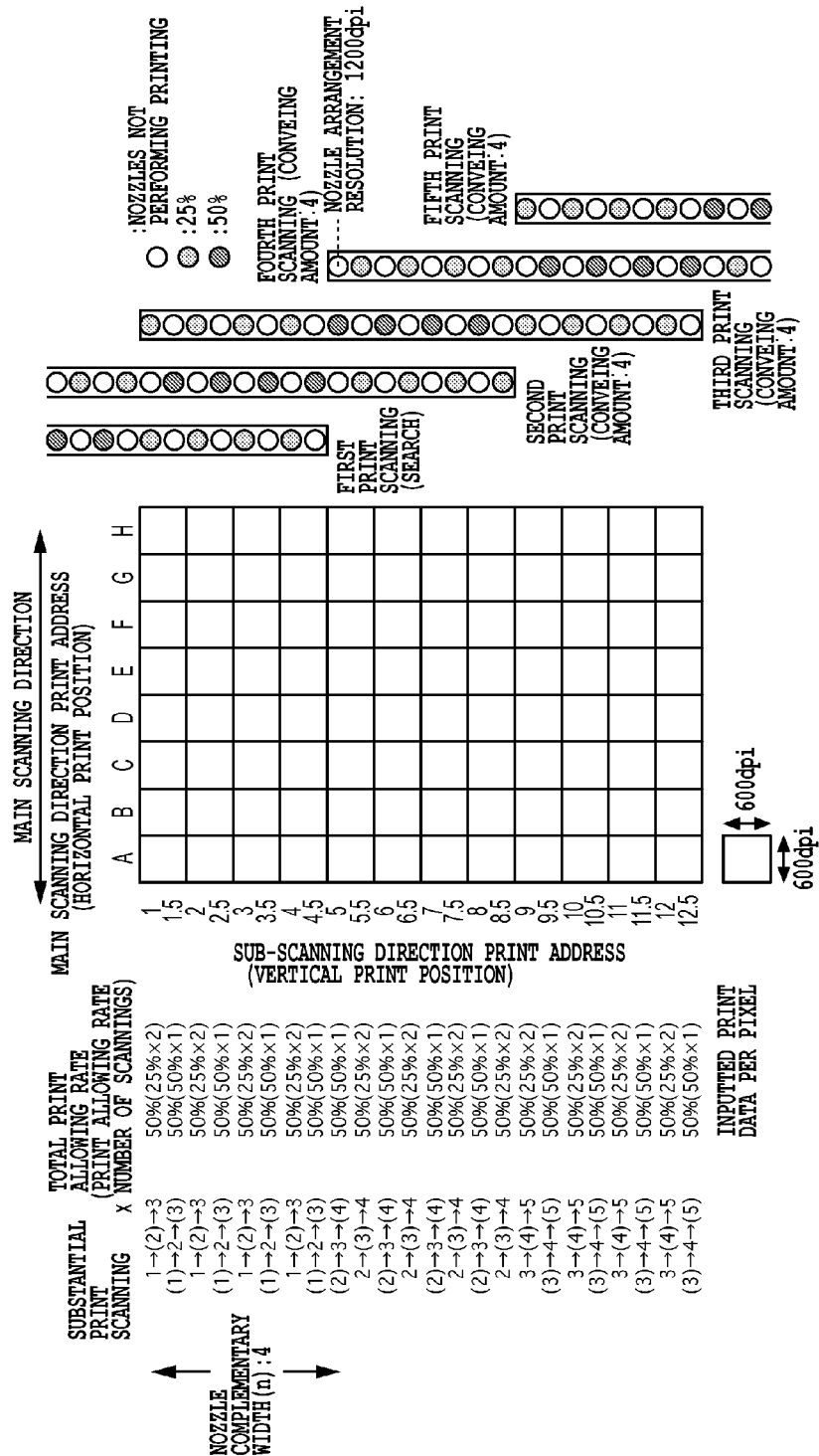
FIG. 16 is an explanatory view for explaining one example of the printing operation in the case where another embodiment of the present invention is applied.
Figure 17:
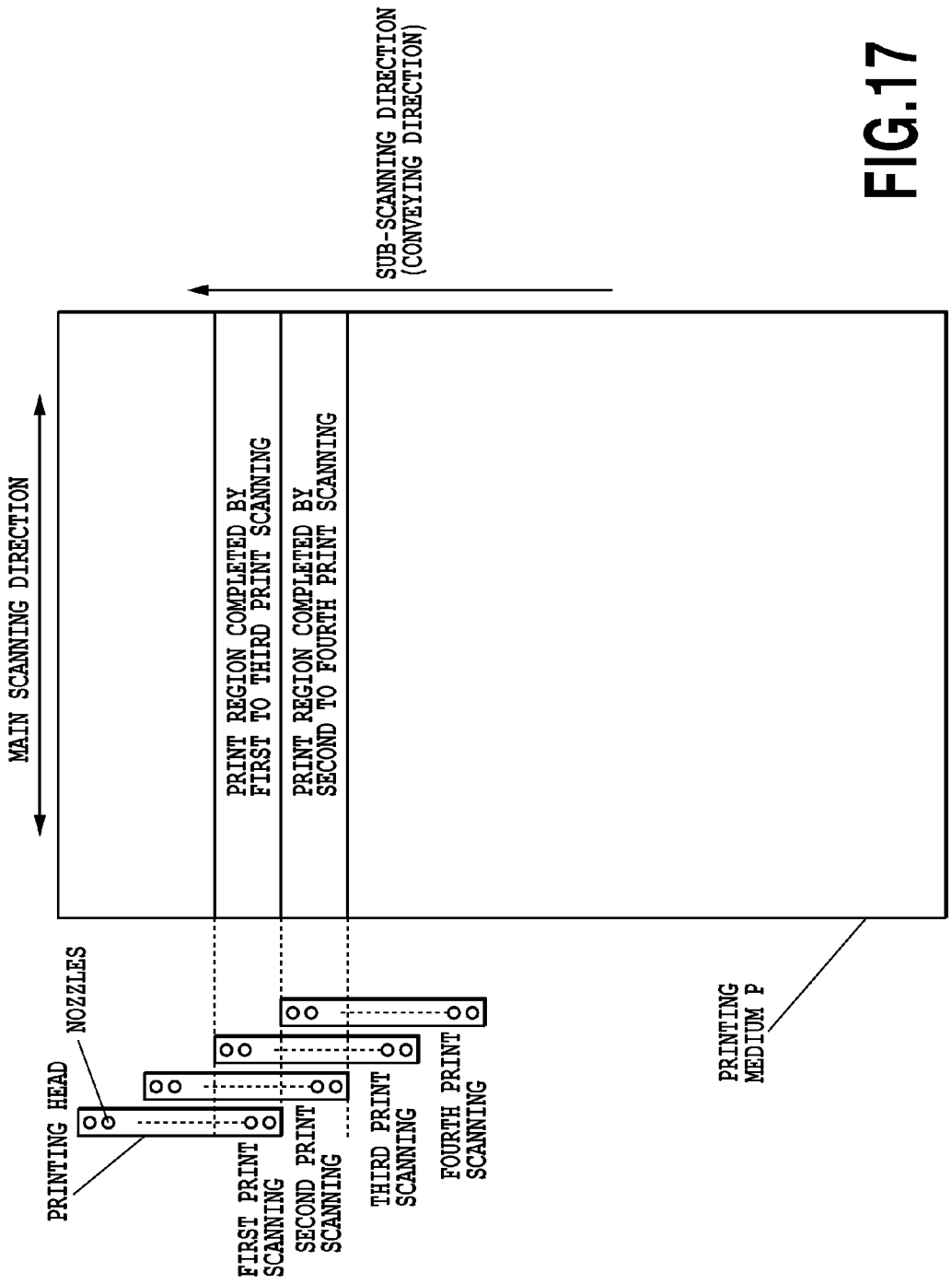
FIG. 17 is an explanatory view of a multipass printing method.
Figure 18:
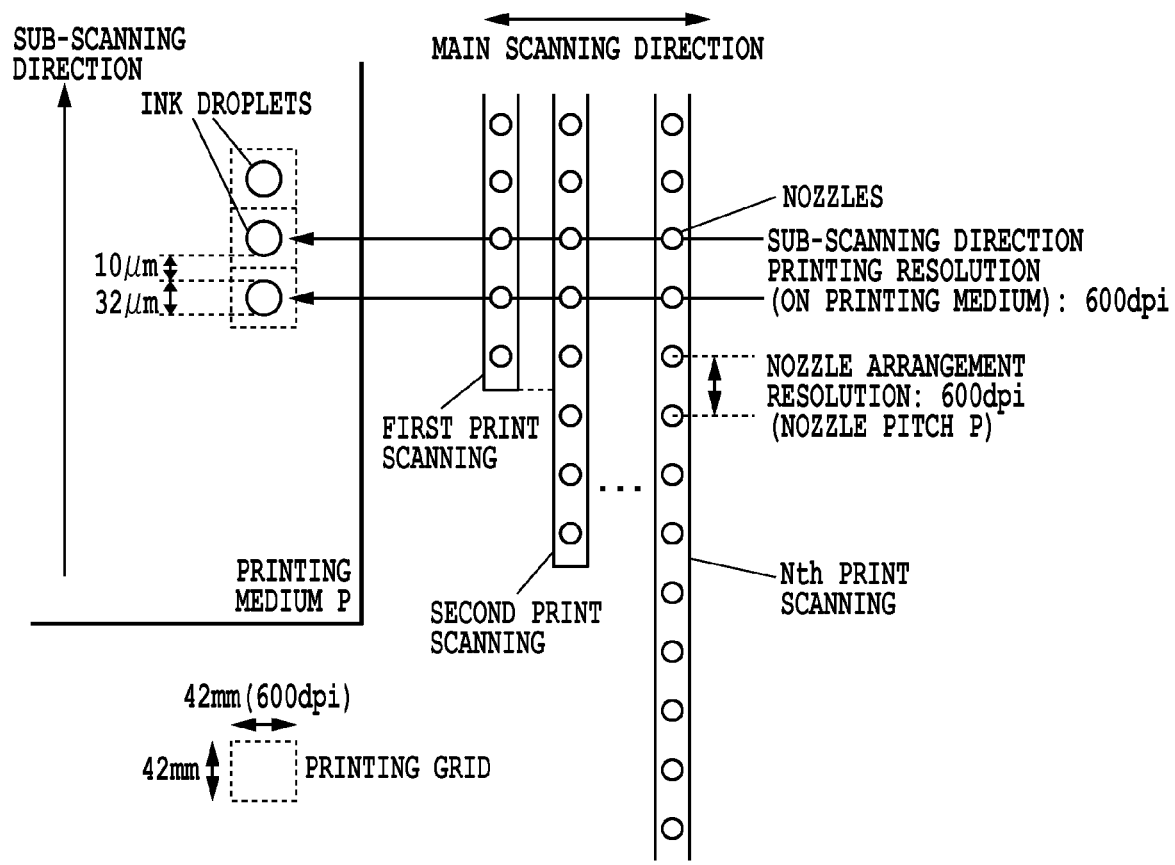
FIG. 18 is an explanatory view of a problem which occurs in a conventional multipass printing.

FIG. 16 is an explanatory view of illustrating this. In this case, a printing head with a nozzle arranging resolution of 1200 dpi is used, while the resolution of the inputted image data is 600 dpi, as is the case with the above-described embodiment. In addition, the printing head should be used while the position of the nozzles is switched so that the positions of nozzles to be actually used are the same as those shown in FIG. 4, and the conveying amounts are set to be an equal amount equivalent to 4 nozzles. At this time, the actual printing operation can be made to be the same as that in Embodiment 1, by applying the same masks as those in Embodiment 1 to the nozzle to be used. As a result of this, a similar operational effect can be obtained as Embodiment 1. Note that, also in the case of FIG. 16, the region in which the inputted image data equivalent for 1 raster is printed corresponds to the "unit region". In addition, in the above-described Embodiments 1 to 3, as the combinations of the number of passes N and the number of divisions m, the combination of N=3 and m=2, the combination of N=5 and m=2, and the combination of N=4 and m=3 were described. However, the combination of N and m is not limited to them. The present invention can be applied to any combination, in which N is an integer equal to or greater than 3, m is an integer equal to or greater than 2, and N is not an integral multiple of m.

The printing apparatus shown in FIG. 1 is capable of color printing with use of inks of C, M, Y and K. However, the number of color tones (including color and density) of inks to be used can also be determined as appropriate.

Further, the above-described embodiments provide the description of the example where a printing head employing the method of ejecting ink by bubbling force generated by applying the heat energy generated by the electrothermal transducer element to the ink, that is, a so called thermal-type inkjet method is used. However, the present invention is not limited to this. For example, a printing head using a piezoelectric actuator such as a piezoelectric element or the like for ejecting ink may be used. In addition, the present invention can also be applied to any printing apparatus as long as it uses the array of the printing element and performs printing by means of the dots formed by each printing element. In other words, the present invention may be applied to a printing apparatus other than the inkjet printing apparatus, for example, to a printing apparatus using a thermal transfer-type printing head or a wire dot-type printing head.

Further, the numerical values, such as the number of nozzles arranged on the printing head and the conveying amount after main scanning, shown in each of the above-described embodiments were illustrated just for simplifying the description. It is needless to say that the present invention is not limited by the illustrated numerical values.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-242669, filed Sep. 19, 2007, which is hereby incorporated by reference herein in its entirety.

What is claimed is:

1. A printing apparatus for performing printing with use of a printing head in which printing elements are arranged in a predetermined direction to form dots on a printing medium, the printing apparatus comprising:
   a print controller that completes a printing for a unit region on the printing medium by causing a printing movement for printing by moving the printing head relative to the printing medium in a first direction different from the predetermined direction and a conveying operation for conveying the printing medium in a second direction intersecting the first direction by an amount smaller than a width at which the printing elements are arranged, the printing for the unit region being executed by N (N is an integer equal to or greater than 3 or more) times of the printing movement; and
   a divider that divides inputted image data to be printed on the unit region into image data corresponding to m rasters that continue in the second direction (where m is an integer equal to or greater than 2), wherein
   when N is not an integral multiple of m, the divider divides the inputted image data so that the dots are formed for the m rasters at a substantially equal rate.

2. A printing apparatus as claimed in claim 1, wherein a width in a second direction of the raster is larger than a pitch at which the printing elements are arranged.

3. A printing apparatus as claimed in claim 1, wherein the divider divides the inputted image data with use of a mask on which print allowing pixels are arranged.

4. A printing apparatus as claimed in claim 1, wherein the divider allocates the inputted image data to the m rasters alternately, randomly or depending on positions in the first direction in order to almost evenly divide the inputted image data for the m rasters.

5. A printing apparatus as claimed in claim 1, wherein the amount of the conveying operation is an amount equivalent to a non-integral multiple of a pitch at which the printing elements are arranged.

6. A printing apparatus as claimed in claim 1, wherein a pitch of the printing elements used for each printing movement is smaller than a pitch at which the printing elements are arranged.

7. A data processing method of processing data used for completing a printing for a unit region on a printing medium, the printing being executed by causing a printing movement for printing by moving a printing head in which printing elements are arranged in a predetermined direction to form dots on the printing medium relative to the printing medium in a first direction different from the predetermined direction and a conveying operation for conveying the printing medium in a second direction intersecting the first direction by an amount smaller than a width at which the printing elements are arranged, and by causing N (N is an integer equal to or greater than 3 or more) times of the printing movement to the unit region, the data processing method comprising the steps of:
   inputting image data to be printed on the unit region; and
   dividing the inputted image data into image data corresponding to m rasters that continue in the second direction (where m is an integer equal to or greater than 2), wherein
   in the step of dividing inputted image data, the inputted image data is divided so that the dots are formed in the m the rasters at a substantially equal rate when N is not an integral multiple of m.

* * * * *